US010970991B1

(12) United States Patent  
Alovert

(10) Patent No.: US 10,970,991 B1  
(45) Date of Patent: Apr. 6, 2021

(54) MOISTURE SENSING ROOFING SYSTEMS AND METHODS THEREOF

(71) Applicant: Building Materials Investment Corporation, Dallas, TX (US)

(72) Inventor: Igor Alovert, Morristown, NJ (US)

(73) Assignee: Building Materials Investment Corporation, Dallas, TX (US)

( * ) Notice: Subject to any disclaimer, the term of this patent is extended or adjusted under 35 U.S.C. 154(b) by 0 days.

(21) Appl. No.: 17/094,427

(22) Filed: Nov. 10, 2020

Related U.S. Application Data

(60) Provisional application No. 63/086,251, filed on Oct. 1, 2020.

(51) Int. Cl.
| | | |
|---|---|---|
| *G08B 21/20* | (2006.01) | |
| *G16Y 40/10* | (2020.01) | |
| *G16Y 20/10* | (2020.01) | |

(52) U.S. Cl.  
CPC .............. *G08B 21/20* (2013.01); *G16Y 20/10* (2020.01); *G16Y 40/10* (2020.01)

(58) Field of Classification Search  
CPC ........ G08B 21/20; G08B 21/22; G08B 21/24; G08B 19/00; G08B 25/14; G01N 27/0487  
See application file for complete search history.

(56) References Cited

U.S. PATENT DOCUMENTS

| | | | | |
|---|---|---|---|---|
| 7,042,352 B2 * | 5/2006 | Kates | ...................... | G08B 1/08 340/3.1 |
| 7,102,504 B2 * | 9/2006 | Kates | ...................... | G08B 1/08 340/286.01 |
| 7,102,505 B2 * | 9/2006 | Kates | ...................... | G08B 1/08 340/286.01 |
| 7,142,107 B2 * | 11/2006 | Kates | ...................... | H04Q 9/00 340/539.1 |
| 7,142,123 B1 * | 11/2006 | Kates | ................... | G01N 27/048 340/602 |
| 7,218,237 B2 * | 5/2007 | Kates | ..................... | G08B 19/00 137/312 |
| 7,230,528 B2 * | 6/2007 | Kates | ................... | G08B 25/009 340/521 |
| 7,336,168 B2 * | 2/2008 | Kates | ................. | G08B 21/0236 340/506 |
| 7,433,648 B2 * | 10/2008 | Bridgelall | .............. | H01Q 1/007 340/506 |
| 7,561,057 B2 * | 7/2009 | Kates | ................... | G01M 3/002 340/605 |

(Continued)

*Primary Examiner* — Hoi C Lau  
(74) *Attorney, Agent, or Firm* — Greenberg Traurig, LLP

(57) ABSTRACT

In some embodiments, the present disclosure provides an exemplary system that includes radio frequency (RF) tags; positioned at locations throughout a roof; a tag reader configured to: generate reader RF signals at one or more frequencies to read the plurality of RF tags, and detect return RF signals from the plurality of RF tags; where the RF signals carry tag data comprising impedance values and tag identifiers; a processor of a computing device, programmed to receive the tag data; determine corresponding locations of the plurality of RF tags; and determine a wet state or dry state of the roof at one or more corresponding locations, and output an indicator of the wet state or the dry state of the roof at the one or more corresponding locations.

20 Claims, 17 Drawing Sheets

(56) References Cited

U.S. PATENT DOCUMENTS

| | | | |
|---|---|---|---|
| 8,402,984 B1* | 3/2013 | Ziegenbein | E03B 7/071 |
| | | | 137/15.11 |
| 8,963,726 B2* | 2/2015 | Kates | H04B 1/69 |
| | | | 340/628 |
| 9,805,261 B1* | 10/2017 | Loveland | B64F 5/60 |
| 9,923,515 B2 | 3/2018 | Rodrigues et al. | |
| 10,546,227 B2 | 1/2020 | Marciello et al. | |
| 10,756,919 B1* | 8/2020 | Kerzner | H04L 12/2827 |
| 2005/0262923 A1* | 12/2005 | Kates | F24F 11/30 |
| | | | 73/29.01 |
| 2005/0275527 A1* | 12/2005 | Kates | G08B 25/009 |
| | | | 340/539.22 |
| 2005/0275528 A1* | 12/2005 | Kates | H04W 52/0225 |
| | | | 340/539.22 |
| 2005/0275529 A1* | 12/2005 | Kates | G08B 1/08 |
| | | | 340/539.22 |
| 2005/0275530 A1* | 12/2005 | Kates | G08B 25/009 |
| | | | 340/539.22 |
| 2005/0275547 A1* | 12/2005 | Kates | G08B 21/182 |
| | | | 340/605 |
| 2006/0005312 A1* | 1/2006 | Reddy | E03D 5/10 |
| | | | 4/668 |
| 2006/0007008 A1* | 1/2006 | Kates | G08B 19/00 |
| | | | 340/605 |
| 2006/0071773 A1* | 4/2006 | Ahmed | A01K 1/031 |
| | | | 340/521 |
| 2006/0267756 A1* | 11/2006 | Kates | H04B 1/69 |
| | | | 340/521 |
| 2006/0273896 A1* | 12/2006 | Kates | G08B 25/10 |
| | | | 340/539.18 |
| 2007/0063833 A1* | 3/2007 | Kates | G08B 25/009 |
| | | | 340/521 |
| 2007/0139183 A1* | 6/2007 | Kates | G08B 25/14 |
| | | | 340/521 |
| 2008/0213529 A1* | 9/2008 | Gray | E04F 15/02 |
| | | | 428/44 |
| 2008/0309502 A1* | 12/2008 | Boccia | A62C 3/0271 |
| | | | 340/578 |
| 2009/0045939 A1* | 2/2009 | Holland | H04W 24/00 |
| | | | 340/524 |
| 2010/0123583 A1* | 5/2010 | Bommer | G08B 25/009 |
| | | | 340/572.7 |
| 2010/0176189 A1* | 7/2010 | Gray | G01S 1/68 |
| | | | 235/375 |
| 2014/0368373 A1* | 12/2014 | Crain | H01Q 1/007 |
| | | | 342/5 |
| 2015/0303489 A1* | 10/2015 | Wang | H01M 4/48 |
| | | | 429/90 |
| 2016/0132839 A1* | 5/2016 | Randolph | G06F 16/9537 |
| | | | 705/305 |
| 2016/0217664 A1* | 7/2016 | Bradford | E04F 15/02 |
| 2016/0374626 A1* | 12/2016 | Heil | A61B 5/202 |
| | | | 340/573.5 |
| 2017/0065464 A1* | 3/2017 | Heil | A61B 5/6892 |
| 2017/0104467 A1* | 4/2017 | Nikitin | H01F 38/14 |
| 2017/0252227 A1 | 9/2017 | Prioleau et al. | |
| 2017/0358202 A1* | 12/2017 | Park | G08C 17/02 |
| 2018/0330218 A1 | 11/2018 | Marciello et al. | |
| 2019/0063608 A1 | 2/2019 | Robinson et al. | |
| 2019/0066464 A1* | 2/2019 | Wedig | G08B 25/14 |
| 2019/0122014 A1* | 4/2019 | Leafloor | G06K 7/1413 |
| 2020/0077233 A1* | 3/2020 | Gottumukkala | H04W 4/80 |
| 2020/0286350 A1* | 9/2020 | Heintzelman | G08B 19/00 |
| 2020/0341457 A1* | 10/2020 | Prugh | A61B 5/6889 |
| 2020/0348183 A1* | 11/2020 | Agarwal | G01J 5/12 |

* cited by examiner

Calibrate each tag to determine the slope of a linear regression of impedance values read from each RF tag
812/921

Cause a tag reader to read, using multiple reader radio frequency (RF) signals, a passive radio frequency identification (RFID) tag located at a location of a roof to receive corresponding multiple response RF signals
1001

Obtain a first impedance value of the RF tag from the first response RF signal at the first frequency
1002

Obtain a second impedance value of the RF tag from the second response RF signal at the second frequency
1003

Determine a dry-state linear regression function of the RF tag based on a linear regression analysis of the first impedance value and the second impedance value
1004

Store the dry-state linear regression function associated with the RF tag and the location identifier of the location of the roof in the database
1005

FIG. 10

Determine whether a section of the roofing deck is dry or wet during installation
822/924

Cause a tag reader to read, by a radio frequency (RF) reader signal at a frequency, a radio frequency (RF) tag located at a location of a roof to receive an return RF signal from the RF tag
1101

Receive the tag data
1102

Determine, based on a tag identifier of the tag data the location of the roof associated with the RF tag
1103

Obtain a dry-state linear regression function associated the tag identifier of the RF tag
1104

Determine a wet state or a dry state of the roof at the location associated with the RF tag based on an impedance value of the RF tag and the dry-state linear regression function of the RF tag
1105

Output an indicator of the wet state or the dry state of the roof at the location
1106

MOISTURE SENSING ROOFING SYSTEMS AND METHODS THEREOF

CROSS-REFERENCE TO RELATED APPLICATIONS

This application claims priority to U.S. Provisional Application No. 63/086,251, filed on Oct. 1, 2020, which is herein incorporated by reference in its entirety.

FIELD OF TECHNOLOGY

The present disclosure generally relates to roofing systems and devices configured for automatic moisture sensing and notification, including moisture sensing and notification using radio-frequency based sensing devices.

BACKGROUND OF TECHNOLOGY

Manual inspection of roofing can result in tedious, inefficient and error-prone identification of excess moisture in a roof and causes thereof, such as leaks, high humidity, and other causes. Such excess moisture can cause aesthetic and structural damage to the roof of structures and to items in the structure.

Attempts to automate or innovate on moisture detection in roofing have numerous shortcomings. For example, some attempts include sending an electrical current through an entire roof membrane to detect moisture. However, such an approach only works on consecutive membranes and on flat roofs. Moreover, these past attempts only detect damage to the membrane causing leaks but does not have any way to detect other avenues for excess moisture, such as humidity. Additionally, prior attempts require hard-wired electrical installations, which can be costly and inefficient, while failing to provide moisture detection during the installation process.

SUMMARY OF DESCRIBED SUBJECT MATTER

In some embodiments, the present disclosure provides an exemplary system that includes at least the following components of a plurality of radio frequency (RF) tags, at least one tag reader and at least one processor of a computing device. The plurality of RF tags, where the plurality of RF tags is positioned at a plurality of locations throughout a roof, where a plurality of location identifiers for the plurality of locations is stored in a database in communication with a computing device. The at least one tag reader is configured to: generate at least one reader RF signal at one or more frequencies to read the plurality of RF tags, and detect at least one return RF signal from at least one RF tag of the plurality of RF tags, where the at least one return RF signal of the at least one RF tag carries tag data including at least one impedance value and at least one tag identifier, where the at least one tag identifier is associated with a corresponding location identifier of the plurality of location identifiers in the database. The at least one processor of the computing device, where the at least one processor is programmed to: receive the tag data; determine, based on the at least one tag identifier of the tag data and from the database, a corresponding location of the at least one RF tag from the plurality of locations; obtain at least one dry state linear regression function associated with the at least one tag identifier of the at least one RF tag; determine a wet state or dry state of the roof at the corresponding location associated with the at least one RF tag based, at least in part, on: i) the at least one impedance value of the at least one RF tag and ii) the at least one dry state linear regression function of the at least one RF tag; and output an indicator of the wet state or the dry state of the roof at the corresponding location.

In some embodiments, the present disclosure provides an exemplary method that includes at least the following steps of causing, by at least one processor of at least one computing device, at least one tag reader to read, by at least one reader radio frequency (RF) signal at one or more frequencies, at least one radio frequency (RF) tag located at a corresponding location of a roof to receive at least one return RF signal from the at least one RF tag, where the at least one return RF signal of the at least one RF tag encodes tag data including at least one impedance value and at least one tag identifier, where the at least one tag identifier of the at least one RF tag is associated with the corresponding location in a database in communication with the at least one computing device; receiving, by the at least one processor, the tag data; determine, based on the at least one tag identifier of the tag data and from the database, the corresponding location of the roof associated with the at least one RF tag; obtaining, by the at least one processor, at least one dry state linear regression function associated the at least one tag identifier of the at least one RF tag; determining, by the at least one processor, a wet state or a dry state of the roof at the corresponding location associated with the at least one RF tag based, at least in part, on the at least one impedance value of the at least one RF tag and the at least one dry state linear regression function of the at least one RF tag, and outputting, by the at least one processor, an indicator of the wet state or the dry state of the roof at the at least one corresponding location.

In some embodiments, the present disclosure provides another exemplary method that includes at least the following steps of causing, by at least one processor, at least one tag reader to read, by a plurality of reader radio frequency (RF) signals, at least one radio frequency (RF) tag located at a corresponding location of a roof to receive a plurality of response RF signals, where the plurality of reader RF signals include: i) a first reader RF signal at a first frequency, and ii) a second reader RF signal at a second frequency; where the plurality of response RF signals include: i) a first response signal at the first frequency in response to the first reader RF signal, and ii) a second response signal at the second frequency in response to the second reader RF signal; where the second frequency is different from the first frequency; where a location identifier of the corresponding location is stored in a database; obtaining, by the at least one processor, a first impedance value of the at least one RF tag from the first response RF signal at the first frequency; obtaining, by the at least one processor, a second impedance value of the at least one RF tag from the second response RF signal at the second frequency; determining, by the at least one processor, a dry state linear regression function of the at least one RF tag based on a linear regression analysis of the first impedance value and the second impedance value; and storing, by the at least one processor, the dry state linear regression function associated with the at least one RF tag and the location identifier of the corresponding location of the roof in the database.

In some embodiments, the present disclosure provides another exemplary method that includes at least the following steps of installing a plurality of radio frequency (RF) tags at a plurality of locations within a roof; where a plurality of location identifiers for the plurality of locations is stored in a database; providing at least one tag reader that is programmed to: generate at least one reader RF signal at one or more frequencies to read the plurality of RF tags; detect at least one return RF signal from at least one RF tag of the plurality of RF tags; where the at least one return RF signal of the at least one RF tag encodes tag data including at least one impedance value and at least one tag identifier; where the at least one tag identifier is associated with a corresponding location identifier of the plurality of location identifiers in the database; providing software instructions for execution by at least one processor, where the software instructions cause the at least one processor to: receive the tag data; determine, based on the at least one tag identifier of the tag data and from the database, a corresponding location of the at least one RF tag from the plurality of locations; obtain at least one dry state linear regression function associated with the at least one tag identifier of the at least one RF tag; determine a wet state or a dry state of the roof at the corresponding location associated with the at least one RF tag based, at least in part, on: i) the at least one impedance value of the at least one RF tag and ii) the at least one dry state linear regression function of the at least one RF tag; and output an indicator of the wet state or the dry state of the roof at the corresponding location.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 1-16 show one or more schematic flow diagrams, certain computer-based architectures, and/or screenshots of various specialized graphical user interfaces which are illustrative of some exemplary aspects of at least some embodiments of the present disclosure.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 16 illustrate systems and methods of detecting moisture state and moisture content using signals from passive radio-frequency (RF) tags. The following embodiments provide technical solutions and technical improvements that overcome technical problems, drawbacks and/or deficiencies in the technical fields involving remote and electronic moisture sensor for pinpoint detection of environmental conditions including moisture in structures, such as in or on roofs. As explained in more detail, below, technical solutions and technical improvements herein include aspects of improved roofing accessories and RF tag dry state calibration to determine moisture states in areas of a roof using RF-based tags. Based on such technical features, further technical benefits become available to users and operators of these systems and methods. Moreover, various practical applications of the disclosed technology are also described, which provide further practical benefits to users and operators that are also new and useful improvements in the art.

Figure 1:
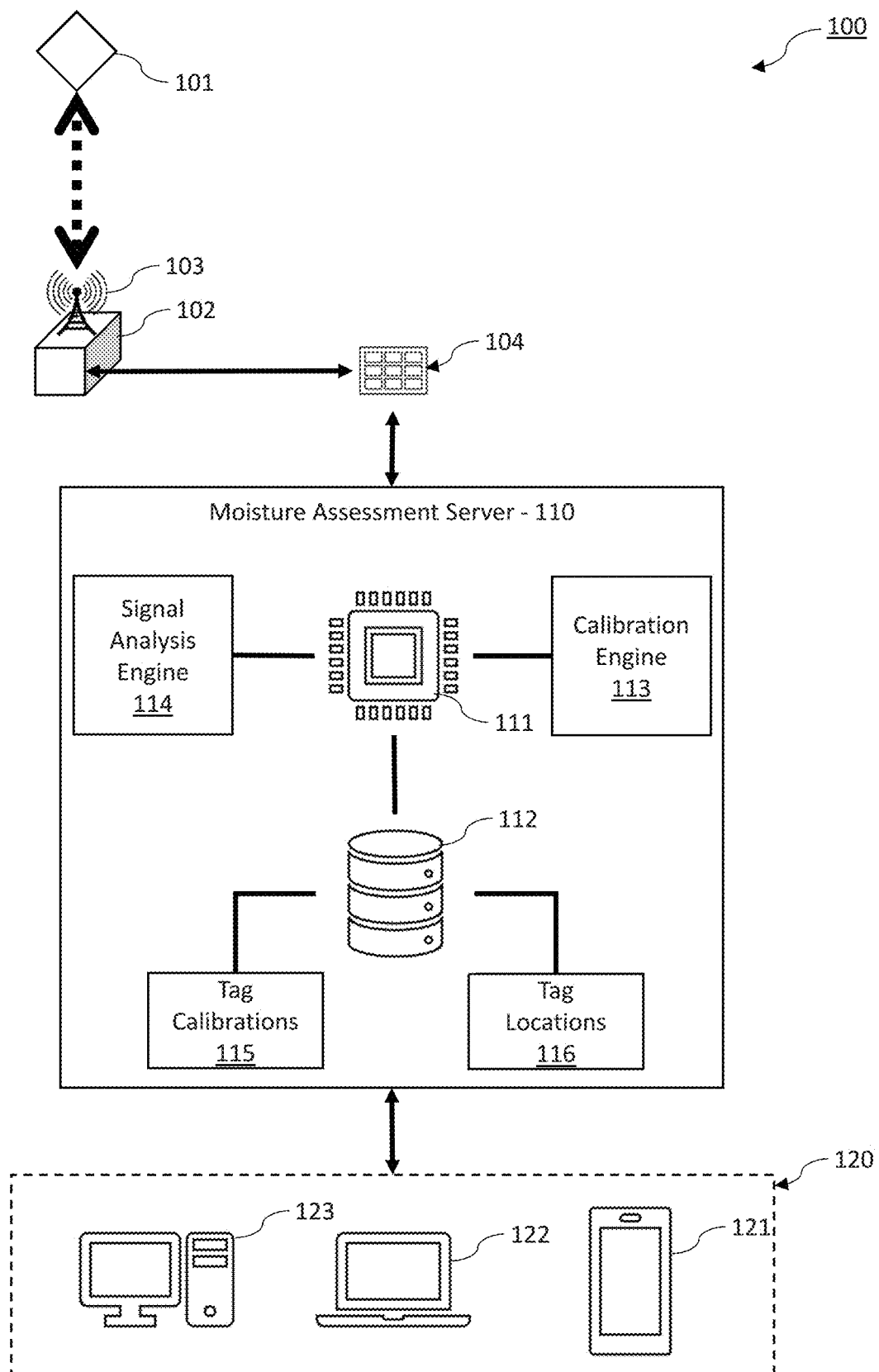

FIG. 1 is a block diagram of an exemplary computer-based system for detecting moisture using signals from a passive radio frequency (RF) tag in accordance with one or more embodiments of the present disclosure.

In some embodiments, a moisture detection system 100 represents a complete system having a customized RF tag 101 installed in a location and calibrated using specialized software and hardware to detect the presence of unwanted moisture. In some embodiments, the system can also detect temperature, and other environment conditions using similar calibration techniques to those described herein. The moisture detection system 100 can identify moisture related issues in a commercial or residential roofing system before it becomes a potentially serious or disastrous problem for the homeowner, building tenant, or building owner. The presence of moisture can be detected either during installation or post installation by periodic examination with a handheld tag reader 102 or a permanent fixed tag reader 102, or by continuous monitoring with the permanent fixed tag reader 102 using a connected computing device that continuously reads the RF tag 101. In some embodiments, a tag reader 102 may read, interrogate or otherwise communicated with the RF tag 101 to return tag data 104 to a moisture assessment server 110.

In some embodiments, tag reader 102 receives the tag data 104 from the RF tag 101 by emitting a reader RF signal via an antenna 103. In some embodiments, the RF tag 101 can be any suitable circuitry for receiving the reader RF signal and returning a return RF signal carrying the tag data 104. The circuitry may include any suitable hardware and software combination for receiving and generating RF signals, and processing information included therein. For example, the circuitry can include, a micro-chip or integrated circuit such as, e.g., a processing device in combination with software-defined radio functionality, RF circuit components, or a combination thereof in communication.

In some embodiments, the circuitry may be responsible for creating and/or interpreting the signals, including, e.g., modulation, demodulation, encoding, decoding, data storage, data processing, among other functionality. To emit or receive signals, the RF tag 101 may also include an antenna in communication with the circuitry. For example, the RF tag 101 can include either fixed or programmable logic for processing the reader RF signal and generating the return RF signal.

In some embodiments, the RF tag 101 may be any passive or active RF tag for communicating via RF signals using the circuitry components, such as a passive or active radio-frequency identification (RFID) tag, near-field communication (NFC) tag, or other suitable circuitry to emit a return RF signal in response to the reader RF signal 104. As referred to herein, an active RF tag 101 has an on-board battery and periodically transmits its ID signal. As referred to herein, a battery-assisted passive RF tag 101 has a battery on board and is activated when in the presence of the tag reader 102. As referred to herein, a passive RF tag 101 is cheaper and smaller because it has no battery; instead, the RF tag 101 uses the radio energy transmitted by the tag reader 102 to power the circuitry and emit the return RF signal.

In some embodiments, the RF tags 101 may also include non-volatile memory to store tag-specific information, such as the tag identifier, sensor data, user data, and other read-only or writable data. For example, the RF tag 101 may either be read-only, having a factory-assigned tag identifier (e.g., a serial number), may be read/write, where object-specific data can be written into the RF tag 101 by the system user, or may be write-once, read-multiple that includes field programmable data that cannot be modified after being written. In some embodiments, a "blank" RF tag 101 may be written with an electronic product code or other data by the user.

In some embodiments, similar to the RF tag 101, the tag reader 102 may include circuitry, such as a micro-chip or integrated circuit, for communicating information via RF signals, including an antenna 103 for emitting and receiving the RF signals. As such, similar to the RF tag 101, the tag reader 102 may be either passive, active or battery-assisted passive. The tag reader 102 and RF tag 101 may be used as a system in any combination of active and/or passive configurations of the RF tag 101 and the tag reader 102.

In some embodiments, there may be a Passive Reader Active Tag (PRAT) system that may include a passive tag reader 102 which only receives return RF signals from an active RF tag 101 (battery operated, transmit only). The reception range of a PRAT system reader can be adjusted from 1-2,000 feet (0-600 m), allowing flexibility in applications such as large roofs or structures, or reduced numbers of tag readers 102, or other scenarios where the tag reader 102 may be situation in long or changing distances from the RF tag 101.

In some embodiments, there may be an Active Reader Passive Tag (ARPT) system that may include an active tag reader 102, which transmits reader RF signals and also receives return RF signals from a passive RF tag 101. The ARPT system has the benefits of using large numbers of low cost and zero energy passive RF tags, such that the RF tag 101 may be cheaply and efficiently implemented and replaced.

In some embodiments, there may be an Active Reader Active Tag (ARAT) system that may use an active RF tag 101 awoken with a reader RF signal from the active tag reader 102. A variation of this system could also use a Battery-Assisted Passive (BAP) RF tag 101 which acts like a passive RF tag but has a small battery to power the RF tag's return RF signal.

In some embodiments, when working as a system, the tag reader 102 may emit the reader RF signal via the antenna 103. In some embodiments, the return RF signal can carry the tag data 104, including, e.g., a tag identifier (such as a serial number, location code, user-defined identifier, or other identifier and combinations thereof), a Received Signal Strength Indicator (RSSI), impedance values at the RF tag 101, among other data. Moisture, or water and water vapor, effect the impedance of circuits. However, the effect of the moisture on the circuits of the RF tag 101 may vary depending on frequency. Thus, in some embodiments, the impedance values may be used to detect moisture in a location around the RF tag 101 depending on both impedance at the RF tag 101 and a frequency of the reader RF signal to which the RF tag 101 is responding. While this relationship between frequency and impedance may be determined, it may only hold true when RSSI is held relatively constant. In some embodiments, the RSSI may be correlated to a distance between the tag reader 102 and the RF tag 101. Thus, the RSSI may be used to set a distance between the tag reader 102 and the RF tag 101 for moisture detection and dry state calibration so ensure that the RSSI is within the appropriate range for determining the relationship between frequency and impedance In RFID technology two different types of RSSI values exist: 1. The RSSI at the tag reader 102; and 2. The RSSI at the RF tag 101. Similarly, impedance exists at both the tag reader 102 and the RF tag 101. For a constant RSSI, to detect moisture, the impedance at the RF tag 101 can be correlated to frequency. So long as the RSSI at the RF tag 101 is within the certain range, moisture may be detected at the RF tag 101 based on the impedance value at the RF tag 101 and the frequency. Thus, the RSSI may be employed to validate reader RF signals to indicate whether the impedance values from the RF tag 101 are meaningful for detecting the moisture state around the RF tag 101. Accordingly, the RF tag 101 may include any suitable RF-based circuitry that is capable of determining the RSSI and impedance at the RF tag 101, such as, e.g., suitable passive RFID tags, among other RF-based tags.

In some embodiments, where the RSSI is insufficient, e.g., less than −100 dBm, less than −50 dBm, less than −10 dBm, or other suitable signal strength threshold, a user may be alerted. In some embodiments, the signal strength threshold may depend on the specific RF tag 101 or RF tag 101 model. However, the signal strength threshold may be in a range of, e.g., 13 to 20 dBm, 10 to 20 dBm, 10 to 25 dBm, 5 to 30 dBm, or other suitable range. For example, the moisture assessment server 110 may detect that the RSSI in the tag data 104 is insufficient and may provide an indicator to a user computing device 120 that the signal is insufficient and the tag data 104 is invalid for moisture detection. Such an indicator may include, e.g., a text-based alert, a graphical alert, an audible alert, or other alert communicating the invalid tag data 104.

In some embodiments, the tag reader 102 may communicate the tag data 104 to the moisture assessment server 110. To do so, the tag reader 102 may include or be connected to computer hardware. In some embodiments, the moisture assessment server 110 is local to the tag reader 102 such that the tag reader 102 may communicate the tag data 104 to the moisture assessment server 110 via, e.g., a direct wired or wireless data connection, such as, e.g., Ethernet, coaxial cabling, optical fiber, Universal Serial Bus (USB), Peripheral Component Interconnect (PCI or PCIe), Serial Advanced Technology Attachment (SATA), WiFi, Bluetooth, Z-Wave, Zigbee, or other connection and combinations thereof. Accordingly, the reader 110 may be implemented as a peripheral device or integral device that interfaces directly with a bus of the moisture assessment server 110.

However, in some embodiments, the tag reader 102 may be a stand-alone computing device, or connected to an external stand-alone computing device that communicates with the moisture assessment server 110 remotely. For example, the tag reader 102 may communicate the tag data 104 via local computer components, to the moisture assessment server 110, such as over a network. In some embodiments, the network may include any public or private network such as, e.g., a local area network (LAN), a wide area network (WAN), the Internet, or other network.

The computing device of the tag reader 102 may include, e.g., at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, where the moisture assessment server 110 is implemented remotely from the tag reader 102, the tag signal processor system 110 may include one or more servers or server systems, such as, e.g., in a cloud system or cloud service.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

As used herein, the term "cloud," refers to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). However, the moisture assessment server 110 may be any remotely located computing system capable of receiving and processing the tag data 104.

In some embodiments, the moisture assessment server 110 employs a system of hardware and software components to communicate with the tag reader 102 to receive the tag data 104, and to determined from the tag data 104 a moisture state or moisture content at a particular location corresponding to the RF tag 101. Accordingly, the moisture assessment server 110 may employ a signal analysis engine 114 to determine from the tag data 104 impedance values of the RF tag 101, moisture state based on the impedance values, among other determinations based on the tag data 104. In some embodiments, when determining the moisture state, the signal analysis engine 114 may utilize calibrated values and/or functions provided by a calibration engine 113, which correlates impedance values to moisture at the location of the RF tag 101. The calibration of the RF tag 101 and the location corresponding to the RF tag 101 may be stored in a database 112, e.g., indexed according to the tag identifier in the tag data 104.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the signal analysis engine 114 and the calibration engine 113 may include any combination of hardware and software elements. For example, in some embodiments, the signal analysis engine 114 and/or the calibration engine 113 may include software elements executed by a processing system 111. Alternatively, the signal analysis engine 114 and/or the calibration engine 113 may include dedicated processing devices separate from the processing system 111. In some embodiments, the processing system 111 may orchestrate the hardware elements of the signal analysis engine 114 and/or the calibration engine 113 to execute the software elements of the signal analysis engine 114 and/or the calibration engine 113.

In some embodiments, processing devices and/or the processing system 111 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processing device and/or the processing system 111 may include data-processing capacity provided by the microprocessor. In some embodiments, the microprocessor may include memory, processing, interface resources, controllers, and counters. In some embodiments, the microprocessor may also include one or more programs stored in memory.

In some embodiments, to initiate a new RF tag 101 for moisture detection at a specified location, the calibration engine 113 may receive the tag data 104 from one or more return RF signals of the RF tag 101, such as, e.g., 2 return RF signals, 5 return RF signals, 10 return RF signal, or greater than 10 return RF signals, where, each return RF signal includes the tag data 104 specifying the tag identifier, one or more impedance values, frequency, and RSSI. RSSI is indicative of a valid reader RF signal for use in moisture detection. Moreover, moisture or water content affects the impedance in the RF tag 101. Therefore, the calibration engine 113 receives the tag data 104 for each return RF signal from the RF tag 101 and performs a dry state calibration for the RF tag 101 at the location of the RF tag 101 based on the impedance value at the RF tag 101 as represented in the tag data 104.

In some embodiments, the dry state calibration may be performed on the assumption that the RF tag 101 was dry at the time of the return RF signal. As a result, dry state calibration may calibrate a dry state linear regression function that correlates impedance values to a dry moisture state or "dry state," e.g., no presence of water around the RF tag 101.

In some embodiments, the signal analysis engine 114 may also determine characteristics of a moisture state of the location of the RF tag 101. For example, where the signal analysis engine 114 determines that the impedance value at the RF tag 101 indicates a wet state, the signal analysis engine 114 may determine the characteristic of moisture content. In some embodiments, the RF tag 101 and the tag reader 102 may be sufficiently sensitive to moisture and detecting the resulting changes to impedance values that the dry state calibration is relative to a known moisture content. The known moisture content may be provided by a user via, e.g., a user computing device 120, such as desktop computer 123, a laptop 122, a mobile computing device 121 (e.g., a smartphone or tablet), or other user computing device. In some embodiments, the known moisture content is pre-set or predetermined. In some embodiments, the known moisture content is provided via a separate moisture sensing device or system. In some embodiments, the moisture content includes quantification of moisture such as, e.g., percent saturation, volume, or other measure of moisture. However, in some embodiments, the known moisture content includes one of a "wet" state or a "dry" state where a wet state indicates a moisture content greater than an amount of moisture at the time of calibration of the RF tag 101.

In some embodiments, the characteristics of the moisture state may be relative measurements, rather than an absolute moisture content measurement. For example, the calibration engine 113 perform the dry state calibration to monitor moisture variation or fluctuation as a characteristic of the moisture state. By monitoring variation or fluctuation of the moisture content rather than an absolute moisture content, the calibration engine 113 can omit calibration relative to a known moisture content and simply form a dry state linear regression function from the linear regression of impedance values as a function of frequency alone. As a result, determination of moisture state with the characteristic of moisture variation is more efficient and faster than determination of moisture state with a characteristic of moisture content.

In some embodiments, dry state calibration only needs to be performed once on location during the installation of the RF tag 101 or after the installation process is completed. In some embodiments, to enable detection of moisture state (e.g., wet state or dry state) using the tag data 104, the calibration engine 113 may instruct the tag reader 102 to read, via multiple reader RF signals, the impedance of the RF tag 101 at different frequencies, e.g., using a frequency hopping technique or other suitable technique for varying frequency. For example, the tag reader 102 may be caused to emit a series of reader RF signals, each at a different frequency, such as, e.g., 2 reader RF signals, 3 reader RF signals, 5 reader RF signals, 10 readers signals, greater than 10 reader RF signals, or other suitable number of reader RF signals, each at a different frequency.

In some embodiments, the frequencies of the reader RF signals may be randomly selected within a frequency band of e.g., 3.1-10 gigahertz (GHz), 2450-5800 megahertz (MHz), 902-928 MHz, 865-868 MHz, 433 MHz, 13.56 MHz, 120-150 Hz, or any sub-band thereof. In some embodiments, the reader RF signals are ultra-high frequency (UHF) signals (e.g., in a frequency band of 902-928 MHz, 865-868 MHz or a combination thereof). In some embodiments, the frequencies are selected based on pre-determined frequency hopping intervals, such as a sequence of reader RF signals having frequencies 1 MHz, 2 MHz, 3 MHz, 5 MHz, 8 MHz, 10 MHz or other interval between consecutive reader RF signals.

In some embodiments, the impedance values vary according to variations in the frequency of the reader RF signals. In some embodiments, this variation can be characterized as a linear relationship between the impedance values and the frequency at the RF tag 101. Accordingly, the calibration engine 113 employs a linear regression calculation to calculate the dry state linear regression function for the RF tag 101. In some embodiments, the dry-state linear regression function for the RF tag 101 represents the relationship of impedance with frequency of the RF tag 101 while the RF tag 101 is dry and may be used to indicate moisture in a location of the RF tag 101 when impedance values deviate from the dry state linear regression function.

In some embodiments, because the dry state linear regression function is a linear regression of multiple values, the calibration engine 113 may determine the R-squared value for the regression. The R-squared value represents deviation of the data points (e.g., impedance values) during dry state calibration from the dry state linear regression function. Thus, the R-squared value represents the quality of the calculated linear regression during the dry state calibration. For example, where the R-squared value is greater than or equal to, e.g., 0.7, 0.8, 0.9, 0.95, 0.99 or other R-squared threshold value, the linear regression may be considered successful. However, where the R-squared value for the dry state linear regression function is below the R-squared threshold value, the calibration engine 113 may instruct the tag reader 102 to emit another sequence of reader RF signals to receive tag data 104 from corresponding return RF signals from the RF tag 101. The linear regression may then be performed again on the new tag data 104.

In some embodiments, where the R-squared value is below the R-squared threshold value, the to reader 102 may be outside of the appropriate range for dry state calibration (e.g., too close or too far from the RF tag 101). Thus, a user may be alerted when the R-square value is below the R-squared threshold value. For example, the moisture assessment server 110 may detect that the R-squared value for the dry state linear regression function is insufficient and may provide an indicator to a user computing device 120 that the impedance values cannot be used to form an accurate or meaningful dry state linear regression function. Such an indicator may include, e.g., a text-based alert, a graphical alert, an audible alert, or other alert communicating the invalid dry state linear regression function.

In some embodiments, the dry state linear regression function for the RF tag 101 may be stored in the database 112 with the tag calibrations 116. The dry state linear regression function can be associated with the tag identifier in the tag data 104. As a result, the dry state linear regression function for the RF tag 101 can be recalled when determining a moisture state at the RF tag 101. For example, the dry state linear regression function can be stored in a look-up-table or index in the database 112 with reference to the tag identifier of the RF tag 101. In some embodiments, the dry state linear regression function can be stored as a file or object in the database 112 with a flag or metadata specifying the tag identifier.

In some embodiments, the dry state linear regression function can be stored as a software function, such as, e.g., a script, macro, or other code object for calculating the deviation of impedance values from the dry state linear regression function based on frequency. In some embodiments, rather than storing the dry state linear regression function, the calibration engine 113 may store values representing the dry state linear regression function in the database 112 with the tag calibrations 116. For example, the dry state linear regression function can be stored in the database 112 as a set of values representing the dry state linear regression function, such as, e.g., alpha and beta values for the regression (e.g., representing slope and y-axis intercept, respectively, or vice versa) and R-squared value. By storing the alpha and beta values rather than the function, storage resource use can be reduced.

In some embodiments, the tag identifier can include, e.g., a serial number, an electronic product code (EPC), a user written or field-programmed identifier, such as location coordinates or identifier, or other identifier. In some embodiments, the location corresponding to the RF tag 101 may be stored in the database 112 with the tag locations 115. Similar to the dry state linear regression function, the location may be stored with reference to the tag identifier. For example, the location can be stored in a look-up-table or index in the database 112 with reference to the tag identifier of the RF tag 101. In some embodiments, the location can be stored as a file or object in the database 112 with a flag or metadata specifying the tag identifier. In some embodiments, the tag locations 115 and the tag calibrations 116 may be stored together, e.g., in the same entry of a look-up-table or index, or in the same file or object, such that referencing or searching the tag identifier may return both the dry state linear regression function and the location for the RF tag 101.

In some embodiments, the tag locations 115 refer to the location of the RF tag 101, along with any other RF tags, as arranged in a predetermined location on a continuous flat surface of a structure being monitored for moisture, such as, of a roof. The tag identifier of the RF tag 101 is pre-recorded on the RF tag 101 (e.g., in the non-volatile memory thereon) before application to the surface. In some embodiments, the tags are logically applied, e.g., via a pattern such as a grid or grid-of-grids, or other logical pattern so that the tag location can be easily identified according to the predetermined location within the pattern. The location of the RF tag 101 can be recorded in the tag locations 116 of the database 112 according to the position of the RF tag 101 in the pattern.

In some embodiments, the signal analysis engine 114 may be configured to use the tag data 104 for determining a moisture state according to subsequent reader RF signals and associated return RF signals. In some embodiments, once the RF tag 101 is applied to the roof, the dry state linear regression function is recalled using the tag identifier from the tag data 104. For example, the signal analysis engine 114 may be configured to obtain from the tag calibrations 116 of the database 112 the linear regression values, e.g., alpha, beta and R-squared values, and apply the linear regression values to determine the moisture state at the location of the RF tag 101 based on the tag data 104.

In some embodiments, during or after installation of the RF tag 101 on the structure, the signal analysis engine 114 may utilize the dry state linear regression function for the tag identifier to evaluate impedance values and determine the moisture state at the location of the RF tag 101. For example, where the alpha and beta values are stored in the database 112, the signal analysis engine 114 may utilize the tag identifier of the RF tag 101 to identify the alpha and beta values, and perform the moisture detection, e.g., according to equation 1 below:

$$\text{Deviation} = \text{Impedance Value} - (\alpha + (\beta \times \text{frequency})) \quad \text{Equation 1}$$

where Impedance Value is the impedance value of tag data 104 from a return RF signal after dry state calibration of the RF tag 101, and frequency is the frequency corresponding to the reader RF signal and/or return RF signal at which the impedance value is read. As can be seen in equation 1, the deviation of the impedance value from the dry state linear regression function for the RF tag 101 can be calculated based on the impedance value and the frequency. This deviation may be used to determine the moisture state at the location of the RF tag 101, In some embodiments, even though the dry state linear regression function for the RF tag 101 is calibrated while the RF tag 101 is dry, subsequently returned impedance values from the RF tag 101 may deviate from the dry state linear regression function to some degree and nevertheless be in a dry state. This may be due to a variety of factors, such as, e.g., normal variations in humidity, error in the impedance value, variations in the RSSI, among other factors. Thus, the deviation may be deemed to indicate a wet state where the deviation exceeds a threshold deviation. The threshold deviation may be determined for each RF tag 101 through, e.g., lab testing or other testing evaluating deviation of impedance values each RF tag 101. In some embodiments, the threshold deviation may be within (+/−), e.g., 5, 10, 15, 20, 25, 5%, 10%, 15%, 20%, 25%, or other amount greater or less than the dry state linear regression function. In some embodiments, the magnitude or extent of deviation may be correlated to a degree of moisture, such as, e.g., humidity level, water volume, or other measure of wetness, where greater deviation may indicate more moisture or more wetness.

In some embodiments, the determination according to equation 2 above may only be performed where the RSSI of the tag data 104 from after dry state calibration is within a certain range indicating a meaningful impedance value for detecting moisture. In some embodiments, the range for the RSSI may be calibrated, e.g., by a manufacturer of the RF tag 101 or in lab tests prior to installation. In some embodiments, RSSI is represented in decibel-milliwatts (dBm) where greater values indicate a stronger signal. Accordingly, an RSSI threshold may be set for signals strong enough to yield accurate or meaningful impedance values at the RF tag 101, such as, e.g., RSSI greater than −100 dBm, greater than −50 dBm, greater than −10 dBm, or other suitable signal strength threshold.

In some embodiments, upon determination of the moisture state at the location of the RF tag 101, the signal analysis engine 114 may generate an indicator of the moisture state (e.g., wet state, or dry state) associated with the RF tag 101. The indicator may include, e.g., text or graphic representation of "wet state" or "dry state", along with a representation, e.g., by text or graphics, of the location of the RF tag 101 on the structure. The indicator may be output, e.g., to one or more of the user computing devices 120, or other computing device in communications with the moisture assessment server 110. Thus, users may be quickly notified of excess moisture in a structure and the pinpoint location of the moisture.

Figure 2:
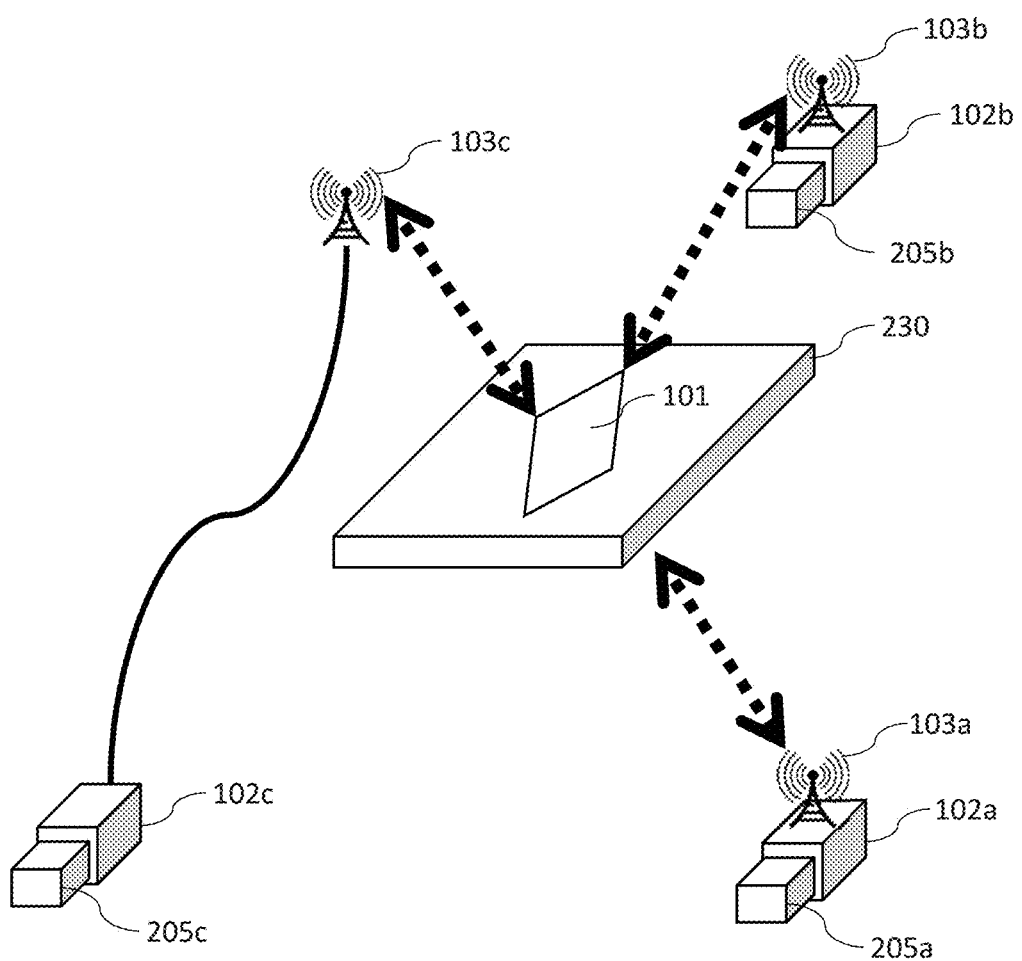

FIG. 2 is a block diagram of an exemplary arrangement of a RF tag and tag reader relative to a roof for detecting moisture using signals from the RF tag in accordance with one or more embodiments of the present disclosure.

In some embodiments, the RF tag 101 may be installed on structures including building to home roofs 230. In some embodiments, the RF tag 101 may be applied directly to the roof structure, or to a roofing material installed thereon. As used herein, the term "roofing material" includes, but is not limited to, shingles, waterproofing membranes, underlayment, tiles and photovoltaic panels.

In some embodiments, the RF tag 101, along with any other RF tags, is arranged in a predetermined location on a continuous flat surface of the roof 230. The tag identifier of the RF tag 101 is pre-recorded on the RF tag 101 (e.g., in the non-volatile memory thereon) before application to the surface. In some embodiments, the RF tag 101 is logically applied, e.g., according to a pattern such as a grid or grid-of-grids, or other logical pattern. Thus, the location of the RF tag 101 can be recorded, e.g., in the tag locations 116 of the database 112 described above, according to the position of the RF tag 101 in the pattern.

In some embodiments, the RF tag 101 is applied to the roof deck or substrate of the roof 230 before installing the roofing material. For example, the RF tag 101 may be glued or otherwise adhered directly onto the roof deck. In some embodiments, the RF tag 101 may be woven into a fabric mesh (e.g., silk, nylon, polyester, cotton, or other fabric material), which may be laid on the roof 230 and adhered thereto. The roofing material may then be laid over the RF tag 101. Accordingly, the RF tag 101 may situated between the roofing material and the roof deck to provide moisture detection under the roofing material. This arrangement enables the moisture detection using the RF tag 101 to detect potential leaks, e.g., due to holes, cracks, seems, or other openings, in the roofing material that could potentially cause damage to the roof 230.

In some embodiments, the RF tag 101 is installed as part of the roofing material. For example, the RF tag 101 may be attached to the roofing material prior to the installation of the roofing material, for example, adhered to the underside of a shingle, woven into or embedded in a roofing membrane, or other forms of attachment. The roofing material may then be laid down on the roof 230. In some embodiments, upon installing the roofing material, the location of the RF tag 101 within the pattern on the roof 230 may be established and recorded, e.g., by writing the location to the database 112 and/or the memory of the RF tag 101.

In some embodiments, the antenna 103a of the tag reader 102a may be configured to emit reader RF signals of sufficient power to penetrate roofing material and the roof deck. Thus, in some embodiments, the RF tag 101 may be read by the tag reader 102a from beneath the roof 230 (e.g., from within a structure associated with the roof).

However, a tag reader 102b and computing device 205b may also, or alternatively, be employed over the roof to read the RF tag 101 from above using antenna 103b. For example, a user with a handheld type of tag reader 102b may walk along the roof by walking on the roof or through the structure, and reading the RF tag 101. In some embodiments, the tag reader 102b may be a fixed tag reader 102b that is, e.g., affixed or other installed on the roof 230 or nearby and above the roof 230.

However, in some embodiments, a tag reader 102c and computing device 205c may also, or alternatively, be located in within the structure (e.g., an attic or other space), and be connected to an antenna 103c located above the roof 230. In some embodiments, the tag reader 102c may be a fixed tag reader 102c that is, e.g., affixed or other installed within directly beneath or nearby and beneath the roof 230. In some embodiments, the antenna 103c may be a fixed antenna 103c that is, e.g., affixed or other installed on the roof 230 or nearby and above the roof 230.

In some embodiments, the tag reader 102a, 102b, and/or 102c may be connected to or in communication with a computing device 205a, 205b, and/or 205c, respectfully. In some embodiments, such as where a fixed tag reader 102a-102c is employed, the computing device 205a-205c may facilitate data processing and communication of tag data to a processing system, such as the moisture assessment server 110 described above. The computing device may include, e.g., networking hardware to upload the tag data via a wired or wireless network to the moisture assessment server 110. For example, the tag reader 102a-102c and computing device 205a-205c may together form a network connected sensor, such as an Internet-of-Things sensor, e.g., for use in a smart home or smart building. In some embodiments, the computing device 205a-205c may perform the moisture detection calculations by locally calibrating and processing RF tag 101 return RF signals. In some embodiments, the computing device 205a-205c may perform any combination of the calibration, processing and data upload to the moisture assessment server 110.

Figure 3:
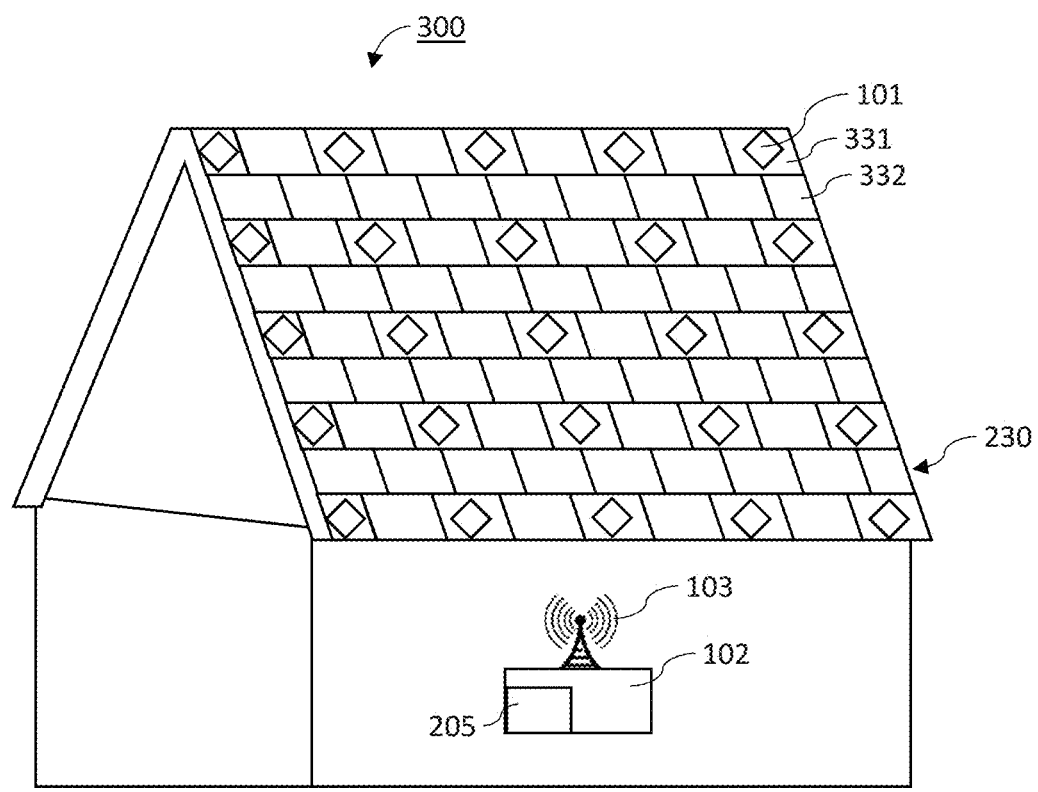

FIG. 3 is a block diagram of an exemplary arrangement of a RF tag and tag reader in a structure having a shingled roof for detecting moisture using signals from the RF tag in accordance with one or more embodiments of the present disclosure.

In some embodiments, multiple RF tags 101 are installed on a roof 230 of a house, building, or other structure 300 according to a predetermined or logical pattern with the roofing material of the roof 230. In some embodiments, the roofing material include shingles 331/332 arranged across the roof 230. In some embodiments, some shingles 331 may be provided with RF tags 101 before installation on the roof 230 (e.g., "smart" shingles 331), and some shingles 332 may include no RF tag 101 (e.g., "dumb" shingles 332).

For example, the smart shingles 331 may have RF tags 101 embedded within the shingle material, e.g., asphalt or other shingle material, or may be adhered (e.g., with glue, epoxy, or other adhesive) to an underside of the shingle 331. The smart shingles 331 and dumb shingles 332 may then be installed on the roof 230 such that a subset of shingles with the RF tags 101 are arranged according to a predetermined or logical pattern. As a result, the RF tags 101 may be attached to the roof 230 via the smart shingles 331 in the predetermined or logical pattern.

Thus, in some embodiments, the pattern may be determined according to the size and shape of the shingles 331/332, and pattern of the RF tag 101 follows the pattern of the smart shingles 331. For example, the smart shingles 331 may alternate with the dumb shingles 332 across length, height or both of the roof. In some embodiments, the smart shingles 331 may each be separated by, e.g., one, two, three or other suitable number of dumb shingles 332. In some embodiments, the number of dumb shingles 332 between any two smart shingles 331 in a length direction across the roof 230 may be different than the number of dumb shingles 332 between any two smart shingles 331 across a height direction across the roof 230. However, in some embodiments, the number of dumb shingles 332 between any two between smart shingles 331 may be the same for both length and height directions.

However, in some embodiments, the RF tags 101 may be applied to the roof 230 before installation of the shingles 331/332. Thus, the RF tags 101 may be laid out on the roof 230 deck in a predetermined or logical pattern irrespective of the layout of the shingles 331/332. In some embodiments, the RF tags 101 may be applied to the roof deck in a grid pattern, such as, e.g., a square grid, a diamond grid, a rectangular grid, or by some other grid pattern. Herein, the grid pattern refers to the shape created by an equal number of rows and columns of the grid.

In some embodiments, a radius of separation between RF tags 101 in the pattern may be determined to maximize the likelihood of detecting moisture under the shingles 331/332 at any point. Thus, the radius may be determined based on, e.g., a range of moisture detection corresponding to the furthest distance from an RF tag 101 that the RF tag 101 can detect a wet state. In some embodiments, the range of moisture detection for adjacent RF tags 101 may overlap or may be sufficiently near for a statistical probability that any moisture would be detected, for example, a 90%, 95% or 99% confidence that any moisture would be within the range of at least one RF tag 101. Such a confidence level may be based on the area of the roof 230 within the range of each RF tag 101. Therefore, a 90% confidence of detection would result in 90% of the area of the roof being with the range of at least one RF tag 101, and similarly for any other confidence value.

In some embodiments, the distance between an RF tag 101 and any adjacent RF tags 101 may be a predetermined value. For example, the distance may be selected as any value between e.g., 0.1 and 10 inches. However, other distances may be selected, such as a distance within the range of, e.g., between 0.25 and 5 inches, between 0.5 and 5 inches, between 0.25 and 10 inches, between 0.5 and 10 inches, between 5 inches and 10 inches, between 2 inches and 8 inches, between 4 inches and 6 inches, 5 inches, or other suitable distance.

In some embodiments, each RF tag 101 may be associated with its respective location within the pattern on the roof 230. For example, the tag identifier of each RF tag 101 may be stored in the database 112 in association with its location in the pattern. In some embodiments, the local storage or memory of each RF tag 101 may be written with its location in the pattern and each RF tag 101 may be configured to include the location within the tag data of return RF signals. In some embodiments, a local storage or memory of the computing device 205 of the tag reader 102 may be written with the location in the pattern of each RF tag 101, and the computing device 205 may be configured to append the location to the tag data of return RF signals for the associated RF tag 101. In some embodiments, the location may be stored in any combination of the database 110, on each RF tag 101, and in the computing device 205 of the tag reader 102.

In some embodiments, the tag reader 102 may be a fixed or handheld tag reader 102 for reading the RF tags 101. The tag reader 102 and RF tags 101 may conform to any one of the PRAT, ARPT, or ARAT systems described above. However, in some embodiments, to improve cost efficiency and serviceability, the RF tags 101 may be passive RF-based tags such as passive RFID tags. Accordingly, the tag reader 102 is implemented as an active reader to form an ARPT system. The ARPT system has the benefits of using large numbers of low cost and zero energy passive tags, such that the RF tag 101 may be cheaply and efficiently implemented and replaced, while employing an active tag reader 102 for improved reader RF signal range.

In some embodiments, the improved reader RF signal range facilitates fewer tag reader 102 installations in the structure 300 where fixed readers are employed. Moreover, the improved reader RF signal range facilitates easier handheld reading that does not require a user to get as close to the RF tags 101 when performing handheld reading.

In some embodiments, handheld tag readers 102 can be used during roof inspection to detect the presence of moisture in specific locations. In some embodiments, handheld tag readers 102 may be used such as readers from, e.g., TSL, or other RFID reader manufacturers.

In some embodiments, fixed tag readers 102 may be set up to create a specific reader zone which can be tightly controlled. This allows a highly defined reading area for when RF tags 101 go in and out of the reader zone. Mobile readers may be handheld or mounted on carts or vehicles. Fixed readers can be used in a permanent installation within the structure 300 which can be mounted with an antenna 103 on the roof 230 or directly beneath the roof 230 to continuously read the RF tags 101 and report the return RF signals and tag data, e.g., at a pre-determined interval. In some embodiments, the computing device 205 may be configured to control the tag reader 102 to read the RF tags 101 at the pre-determined interval, such as, e.g., every hour, every two hours, every three hours, every four hours, every six hours, every eight hours, every 12 hours, every 24 hours, every week, every month, or according to any other suitable interval. In some embodiments, the computing device 205 may also be in communication with, e.g., the moisture assessment server 110 to upload tag data and receive control commands that cause the tag reader 102 to read the RF tags 101 or adjust the pre-determined interval. Examples of such a fixed tag reader 102 may include, e.g., a Jadak Stationary RFID Reader, or other suitable stationary or fixed reader.

In some embodiments, the antenna 103 of the tag reader 102 may be configured to emit reader RF signals of sufficient power to penetrate roofing material and/or the roof deck. Thus, in some embodiments, the RF tag 101 may be read by the tag reader 102 from beneath the roof 230 (e.g., from within a structure associated with the roof). However, in some embodiments, the antenna 103 may be physically separated from the tag reader 102, with the tag reader 102 installed within the structure 300, and the antenna 103 mounted in a location with better coverage of the RF tags 101, such as on the roof 230.

Figure 4:
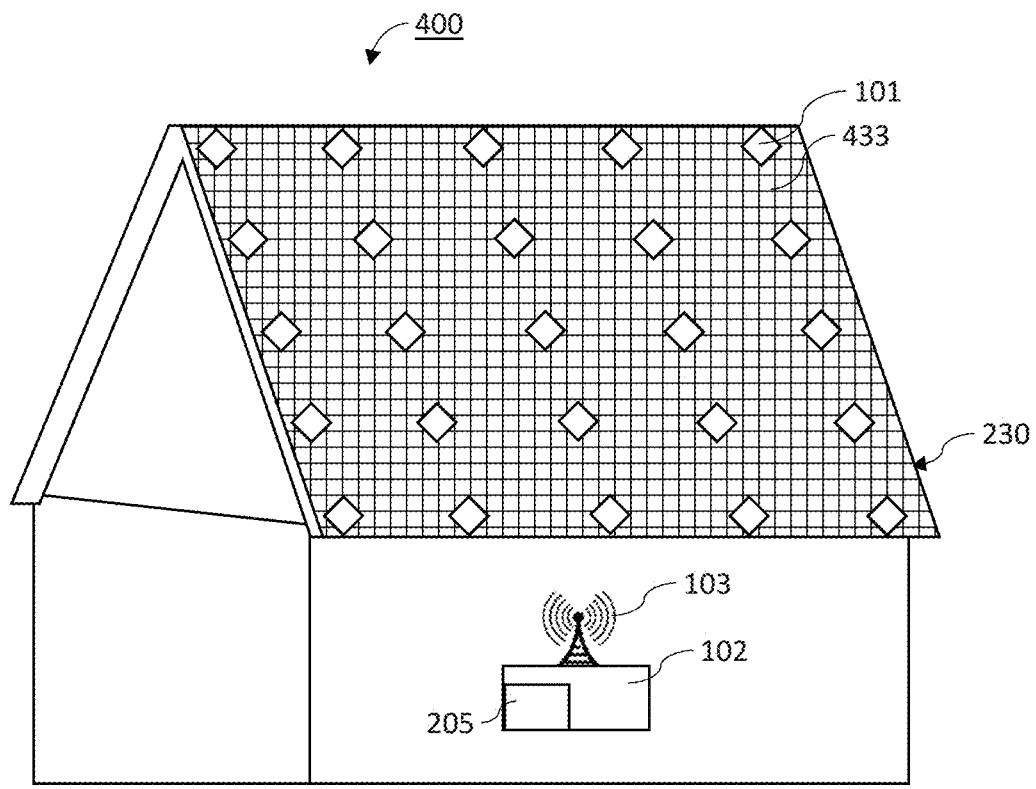

FIG. 4 is a block diagram of an exemplary arrangement of a RF tag and tag reader in a structure having a roofing membrane for detecting moisture using signals from the RF tag in accordance with one or more embodiments of the present disclosure.

In some embodiments, multiple RF tags 101 are installed on a roof 230 of a house, building, or other structure 400 according to a predetermined or logical pattern with the roofing material of the roof 230. In some embodiments, the roofing material includes a roofing membrane 433 arranged across the roof 230. In some embodiments, the roofing membrane 433 may have RF tags 101 embedded within the membrane material, or may be adhered (e.g., with glue, epoxy, or other adhesive) to an underside of the roofing membrane 433 in a predetermine or logical pattern, e.g., based on a spacing of the RF tags 101 across the roofing membrane 433. The roofing membrane 433 may then be installed on the roof 230 such that the RF tags 101 are arranged according to the predetermined or logical pattern across the roof 230.

However, in some embodiments, the RF tags 101 may be applied to the roof 230 before installation of the roofing membrane 433. Thus, the RF tags 101 may be laid out on the roof 230 deck in a predetermined or logical pattern, and then the roofing membrane 433 installed over the pattern of RF tags 101.

In some embodiments, the RF tags 101 may be applied to the roof deck, to the roofing membrane 433, or both, in a grid pattern, such as, e.g., a square grid, a diamond grid, a rectangular grid, or by some other grid pattern. Herein, the grid pattern refers to the shape created by an equal number of rows and columns of the grid.

In some embodiments, a distance separation between RF tags 101 in the pattern may be determined to maximize the likelihood of detecting moisture at any point across the roof 230. Thus, the distance may be determined based on, e.g., a range of moisture detection corresponding to the furthest distance from an RF tag 101 that the RF tag 101 can detect a wet state. In some embodiments, the range of moisture detection for adjacent RF tags 101 may overlap or may be sufficiently near for a statistical probability that any moisture would be detected, for example, a 90%, 95% or 99% confidence that any moisture would be within the range of at least one RF tag 101. Such a confidence level may be based on the area of the roof 230 within the range of each RF tag 101. Therefore, a 90% confidence of detection would result in 90% of the area of the roof being with the range of at least one RF tag 101, and similarly for any other confidence value.

In some embodiments, the distance of separation between an RF tag 101 and any adjacent RF tags 101 may be a predetermined value. For example, the distance may be selected as any value between e.g., 0.1 and 10 inches. However, other distance may be selected, such as a distance within the range of, e.g., between 0.25 and 5 inches, between 0.5 and 5 inches, between 0.25 and 10 inches, between 0.5 and 10 inches, between 5 inches and 10 inches, between 2 inches and 8 inches, between 4 inches and 6 inches, 5 inches, or other suitable distance.

In some embodiments, each RF tag 101 may be associated with its respective location within the pattern on the roof 230. For example, the tag identifier of each RF tag 101 may be stored in the database 112 in association with its location in the pattern. In some embodiments, the local storage or memory of each RF tag 101 may be written with its location in the pattern and each RF tag 101 may be configured to include the location within the tag data of return RF signals. In some embodiments, a local storage or memory of the computing device 205 of the tag reader 102 may be written with the location in the pattern of each RF tag 101, and the computing device 205 may be configured to append the location to the tag data of return RF signals for the associated RF tag 101. In some embodiments, the location may be stored in any combination of the database 110, on each RF tag 101, and in the computing device 205 of the tag reader 102.

In some embodiments, the tag reader 102 may be a fixed or handheld tag reader 102 for reading the RF tags 101. The tag reader 102 and RF tags 101 may conform to any one of the PRAT, ARPT, or ARAT systems described above. However, in some embodiments, to improve cost efficiency and serviceability, the RF tags 101 may be passive RF-based tags such as passive RFID tags. Accordingly, the tag reader 102 is implemented as an active reader to form an ARPT system. The ARPT system has the benefits of using large numbers of low cost and zero energy passive tags, such that the RF tag 101 may be cheaply and efficiently implemented and replaced, while employing an active tag reader 102 for improved reader RF signal range.

In some embodiments, the improved reader RF signal range facilitates fewer tag reader 102 installations in the structure 400 where fixed readers are employed. Moreover, the improved reader RF signal range facilitates easier handheld reading that does not require a user to get as close to the RF tags 101 when performing handheld reading.

In some embodiments, handheld tag readers 102 can be used during roof inspection to detect the presence of moisture in specific locations. In some embodiments, handheld tag readers 102 may be used such as readers from, e.g., TSL, or other RFID reader manufacturers.

In some embodiments, fixed tag readers 102 may be set up to create a specific reader zone which can be tightly controlled. This allows a highly defined reading area for when RF tags 101 go in and out of the reader zone. Mobile readers may be handheld or mounted on carts or vehicles. Fixed readers can be used in a permanent installation within the structure 400 which can be mounted with an antenna 103 on the roof 230 or directly beneath the roof 230 to continuously read the RF tags 101 and report the return RF signals and tag data, e.g., at a pre-determined interval. In some embodiments, the computing device 205 may be configured to control the tag reader 102 to read the RF tags 101 at the pre-determined interval, such as, e.g., every hour, every two hours, every three hours, every four hours, every six hours, every eight hours, every 12 hours, every 24 hours, every week, every month, or according to any other suitable interval. In some embodiments, the computing device 205 may also be in communication with, e.g., the moisture assessment server 110 to upload tag data and receive control commands that cause the tag reader 102 to read the RF tags 101 or adjust the pre-determined interval. Examples of such a fixed tag reader 102 may include, e.g., a Jadak Stationary RFID Reader, or other suitable stationary or fixed reader.

In some embodiments, the antenna 103 of the tag reader 102 may be configured to emit reader RF signals of sufficient power to penetrate roofing material and/or the roof deck. Thus, in some embodiments, the RF tag 101 may be read by the tag reader 102 from beneath the roof 230 (e.g., from within a structure associated with the roof). However, in some embodiments, the antenna 103 may be physically separated from the tag reader 102, with the tag reader 102 installed within the structure 400, and the antenna 103 mounted in a location with better coverage of the RF tags 101, such as on the roof 230.

Figure 5:
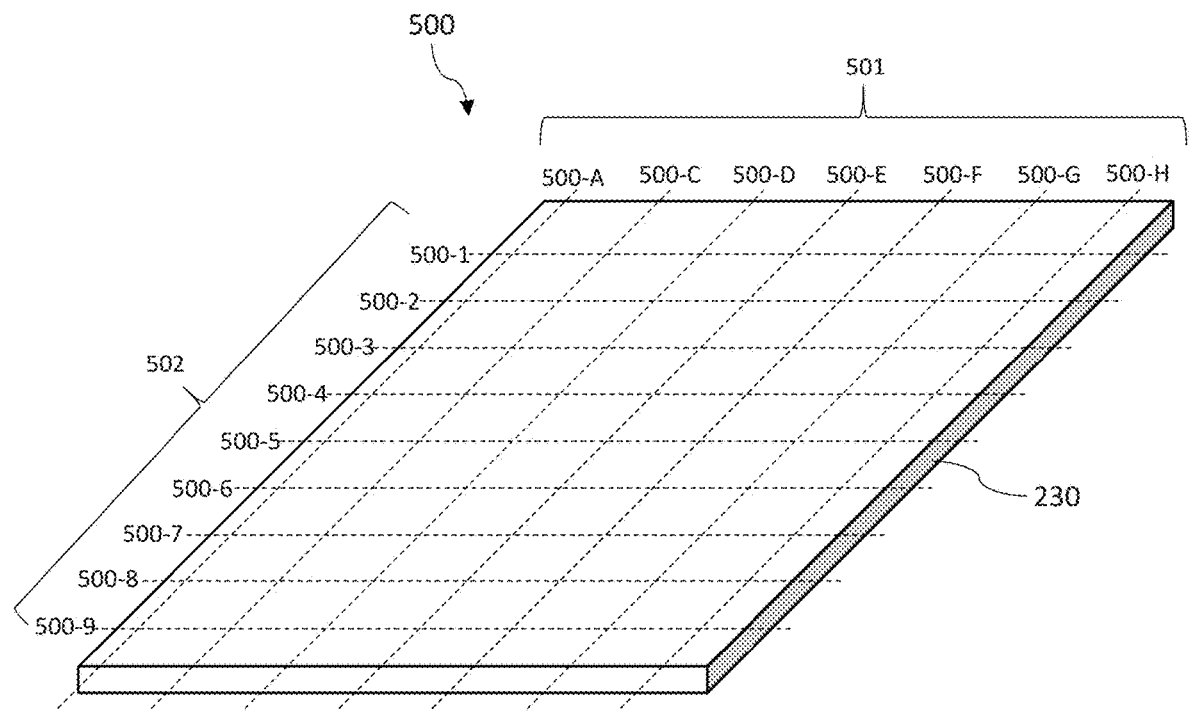

FIG. 5 is a block diagram of an exemplary layout methodology for RF tags on a roof for detecting moisture using signals from a RF tag in accordance with one or more embodiments of the present disclosure.

In some embodiments, the pattern of RF tag 101 installation across a roof 230 may be a grid pattern 500 on every continuous flat surface of the roof 230, such as a square grid, diamond grid or rectangular grid. For example, for square and rectangular grids, the rows and columns of the grid pattern 500 are orthogonal to each other, while the diamond grid has non-orthogonal rows and columns. The square grid can be defined by equal row spacing and column spacing, while the rectangular grid has row spacing that is unequal to the column spacing. The diamond grid may have equal or unequal row and column spacing.

In some embodiments, by using a grid pattern 500 for RF tag 101 locations, the locations can be easily identified according to row indices 502 and column indices 501. For example, as shown in FIG. 5, the column indices 501 may be letters, while the row indices 502 may be numbers. However, other index formats may be used, such as numbers for both row indices 502 and column indices 501, letters for both row indices 502 and column indices 501, a combination of letters and numbers for the row indices 501 and/or column indices 502, or other suitable index formats.

In some embodiments, the RF tag 101 have individual serial numbers or other tag identifiers that can be included in the tag data of return RF signals. The moisture assessment server 110 may store the serial number of each RF tag 101 along with its corresponding location within the grid pattern to discriminate among several RF tags 101 that might be within the range of the tag reader 102. For example, an index or look-up-table may be used to correlate the serial number with the grid indices specifying the row 502 and column index 501 of a particular RF tag 101. As a result, the tag reader 102 can read multiple RF tags 101 simultaneously and the moisture assessment server 110 and/or the computing device 205 of the tag reader 102 may identify the specific location of tag data from each return RF signal.

Figure 6:
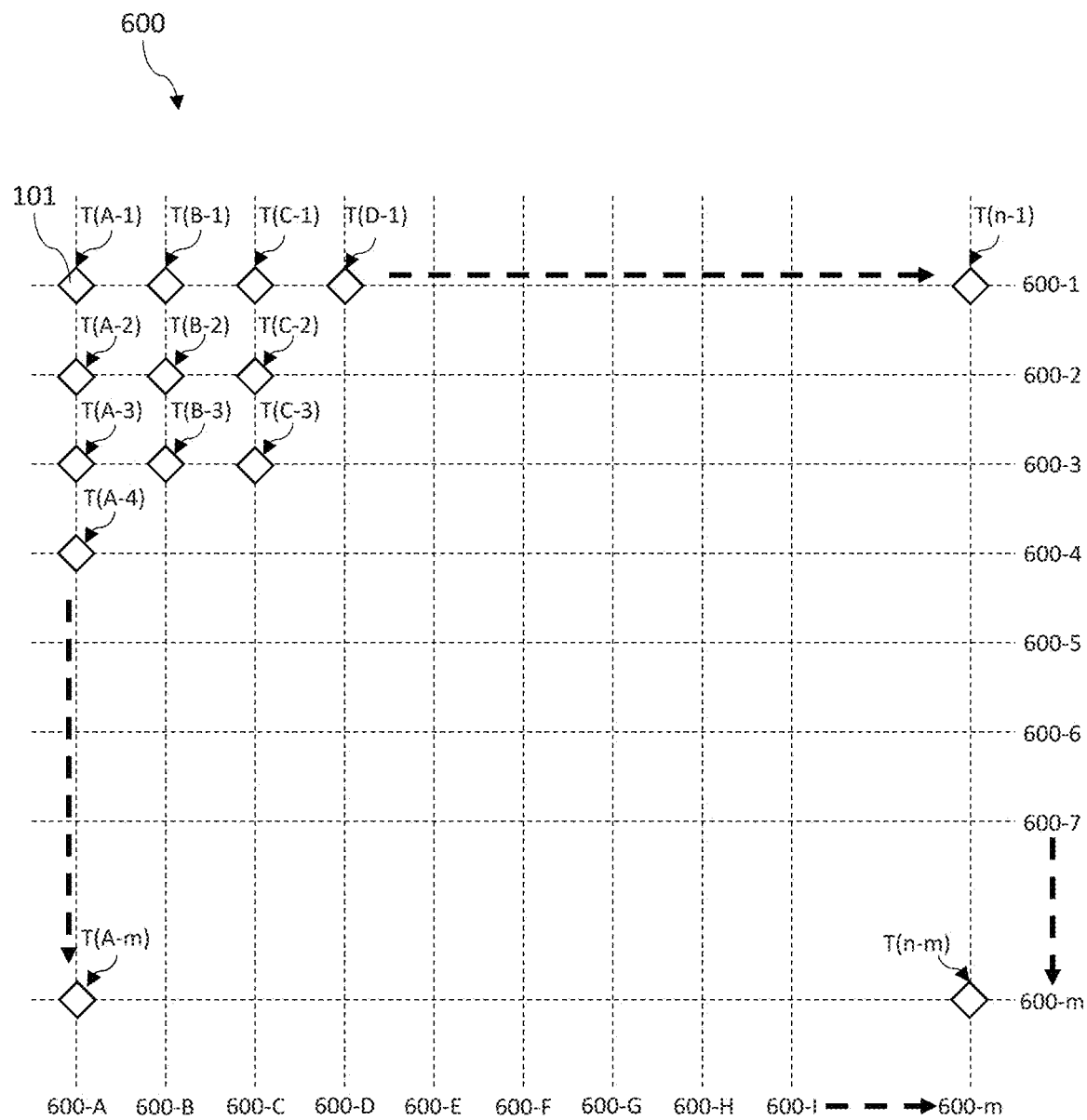

FIG. 6 is a schematic of an exemplary square grid of RF tags for detecting moisture using signals from the RF tag in accordance with one or more embodiments of the present disclosure.

In some embodiments, the pattern of RF tag 101 installation across a roof 230 may be a square grid pattern 600 on every continuous flat surface of the roof 230 (e.g., a roof deck). The square grid can be defined by equivalently spaced orthogonal rows and columns. In some embodiments, the rows and columns are each identified by respective indices, where an intersection between a row and a column can be identified by coordinates including the index of each of the row and the column associated with the intersection.

For example, column 600-A intersects with row 600-1 at coordinate (A-1). In some embodiments, the square grid 600 may include any suitable number of rows to extend across a height of the roof deck. Accordingly, the rows can be indexed according to the number of rows to span across the roof deck using, e.g., numbers 1 through m. Similarly, in some embodiments, the square grid 600 may include any suitable number of columns to extend across a length of the roof deck. Accordingly, the columns can be indexed according to the number of columns to span across the roof deck using, e.g., letters A through n. As a result, the square grid 600 may form an n by m grid with rows 600-1 through 600-$m$ and columns 600-A through 600-$n$, where the rows and columns have equivalent spacing.

In some embodiments, the spacing between each row and between each column may include a predetermined distance across the roof deck. In some embodiments, the spacing of the rows and the columns may be based on a predetermined or selected distance between the RF tags 101. Here, the diagonally adjacent RF tags 101 include tags that are both one row and one column apart. For example, tag locations of (A-1) and (B-2) are diagonally adjacent. Laterally adjacent RF tags 101 are RF tags that one row or one column apart, but not both, such as, e.g., (A-1) and (B-1) or (A-1) and (A-2), but not (A-1) and (B-2). Because the grid is a square grid 600, the laterally adjacent RF tags 101 will always be closer together than the diagonally adjacent RF tags 101. Accordingly, the row and column spacing is determined based on the laterally adjacent RF tags 101, the diagonally adjacent RF tags 101 and the predetermined or selected distance. For example, because laterally adjacent RF tags 101 are nearer to each other than diagonally adjacent RF tags 101, the spacing may be set to based on a distance between laterally adjacent RF tags 101. In some embodiments, the distance may be in the range of, e.g., between 0.1 and 10 inches, or other suitable distance.

In some embodiments, based on the row and column indices, each RF tag 101 can be assigned a location, including an area defined by the radius around an intersection of a row and a column of the grid 600, as described above. Thus, in some embodiments, each RF tag 101 may be identified by the coordinates of its associated row-column intersection. For example, the RF tag 101 at the intersection of column A 600-A and row 1 600-1 may be located at tag location T(A-1). Tag locations may be defined for each intersection on the grid.

In some embodiments, the RF tag 101 have individual serial numbers or other tag identifiers that can be included in the tag data of return RF signals. The moisture assessment server 110 may store the serial number of each RF tag 101 along with its corresponding location (e.g., T(A-1) through T(n-m)) within the grid pattern to discriminate among several RF tags 101 that might be within the range of the tag reader 102. For example, an index or look-up-table may be used to correlate the serial number with the tag location of a particular RF tag 101. As a result, the tag reader 102 can read multiple RF tags 101 simultaneously and the moisture assessment server 110 and/or the computing device 205 of the tag reader 102 may identify the specific location of tag data from each return RF signal.

Figure 7A:
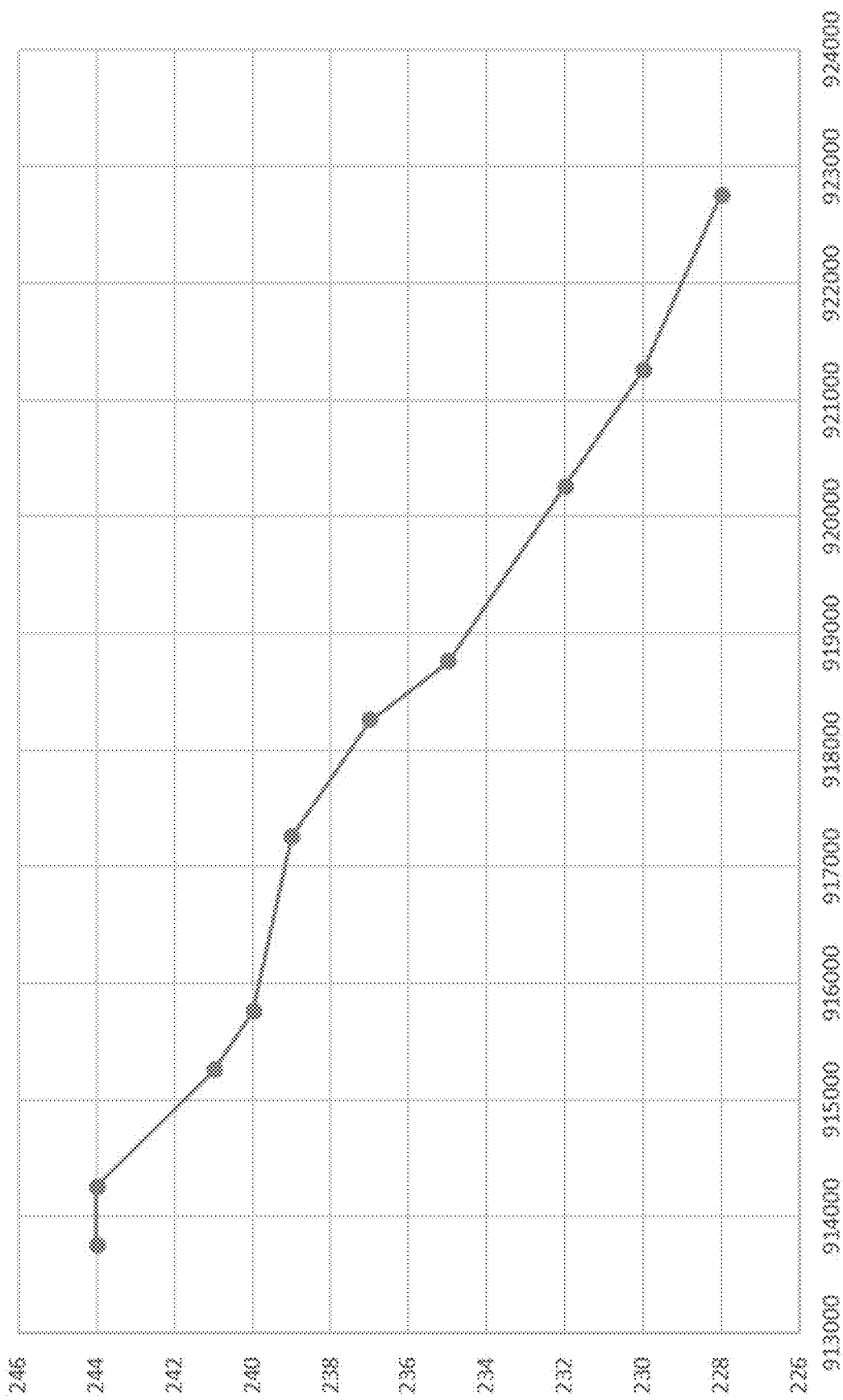

FIG. 7A is a plot of an exemplary RF tag calibration for detecting moisture using signals from a passive radio frequency (RF) tag in accordance with one or more embodiments of the present disclosure.

In some embodiments, dry state calibration only needs to be performed once during the installation or after the installation process is completed. This calibration may be performed for every single RF tag 101 that is applied. In some embodiments, to be able to detect moisture using the RF tag 101 return RF signals accurately, the first step is to determine the impedance value of the RF tag 101 at different frequencies and calculate linear regression, the results of which is recorded in a database and is the dry state linear regression function of the RF tag 101.

In some embodiments, the tag reader 102 reads the RF tag 101 with the different frequencies using a frequency hopping technique, including a series of reader RF signals at varying frequencies. FIG. 7A depicts an example of frequency hopping and the resulting impedance values from an example of the RF tag 101 using the frequency hopping of the linear regression. If the R-squared value is high, e.g., above 0.65, 0.7, 0.75, 0.8, 0.85, 0.9, 0.95, 0.97, 0.98, 0.99, etc., the linear regression and resulting dry state linear regression function can be deemed to be successful.

In some embodiments, calculating a linear regression for the data of Table 1 above may result in a linear regression function having the following regression characteristics (Table 2):

TABLE 2

|  | Coefficients | Standard Error | t Stat | P-value | Lower 95% | Upper 95% | Lower 95.0% | Upper 95.0% |
|---|---|---|---|---|---|---|---|---|
| Alpha | 1924.121 | 69.37774 | 27.73398 | 3.08E−09 | 1764.136 | 2084.107 | 1764.136 | 2084.107 |
| Beta | −0.00184 | 7.56E−05 | −24.318 | 8.73E−09 | −0.00201 | −0.00166 | −0.00201 | −0.00166 | techniques. In this example, the RF tag 101 is an S3 integrated circuit from RFMicron inside a Smartrac Dogbone. In this example 913750 represents 913750 kHz. The impedance value is represented on the y-axis and is dependent on the frequency, represented on the x-axis, at which it is read. The impedance value has a linear relationship to the RF frequency of the reader RF signal and/or return RF signal. Thus, using the relationship between impedance and signal frequency, a linear regression can be calculated. Table 1 below represents the impedance values plotted against frequency in FIG. 7A:

TABLE 1

| Frequency (kHz) | Impedance value (OHMS) |
|---|---|
| 913750 | 244 |
| 914250 | 244 |
| 915250 | 241 |
| 915750 | 240 |
| 917250 | 239 |
| 918250 | 237 |
| 918750 | 235 |
| 920250 | 232 |
| 921250 | 230 |
| 922750 | 228 |

As described above, in some embodiments, the RF tag 101 may support the RSSI value from the RF tag's 101 perspective. Using the RSSI, the impedance values in the tag data 104 may be validated due to sufficient signal quality. Moreover, the RSSI may also be employed to determine a reader distance between the tag reader 102 and the RF tag 101. In some embodiments, the reader distance can be set to be in a range of, e.g., 6 to 10 feet, 4 to 12 feet, or other reader distance for a sufficient RSSI. In some embodiments, for an RSSI to be sufficient, the RSSI may be greater than of, e.g., −100 dBm, −50 dBm, −10 dBm, or other signal strength threshold tag reader 102 in some embodiments, when the tag reader 102 is within the reader distance of the RF tag 101, e.g., 6 to 10 feet, and/or the RSSI at the RF tag 101 is sufficient, e.g., greater than of, e.g., −100 dBm, −50 dBm, −10 dBm, or other signal strength threshold, then the impedance value seen at the RF tag 101 can be checked. In some embodiments, the impedance value seen at the RF tag 101 must fall within certain values for the linear regression to be calculated appropriately. Whether the impedance values fall within the appropriate range can be determined based on the R-squared value When analyzed for regression statistics based on the data of Table 1, the linear regression function may include the statistics of Table 3 below:

TABLE 3

| Regression Statistics | |
|---|---|
| Multiple R | 0.993304 |
| R Square | 0.986653 |
| Adjusted R Square | 0.984984 |
| Standard Error | 0.690775 |
| Observations | 10 |

In some embodiments, an R-squared value above, e.g., 0.7 indicates a successful dry state linear regression. Here, as shown in Table 3, the linear regression results in an R-squared value of 0.986653. As a result, a linear regression of the data of Table 1 provides a successful dry state linear regression function that estimates the relationship between frequency and impedance of the RF tag 101 of Table 1.

In some embodiments, to further validate the dry state linear regression function to the data of Table 1, an analysis of variance (ANOVA) may be conducted. In some embodiments, the ANOVA results in data as shown in Table 4 below:

TABLE 4

|  | df | SS | MS | F | Significance F |
|---|---|---|---|---|---|
| Regression | 1 | 282.1826 | 282.1826 | 591.3663 | 8.73E−09 |
| Residual | 8 | 3.817365 | 0.477171 | | |
| Total | 9 | 286 | | | |

Figure 7B:
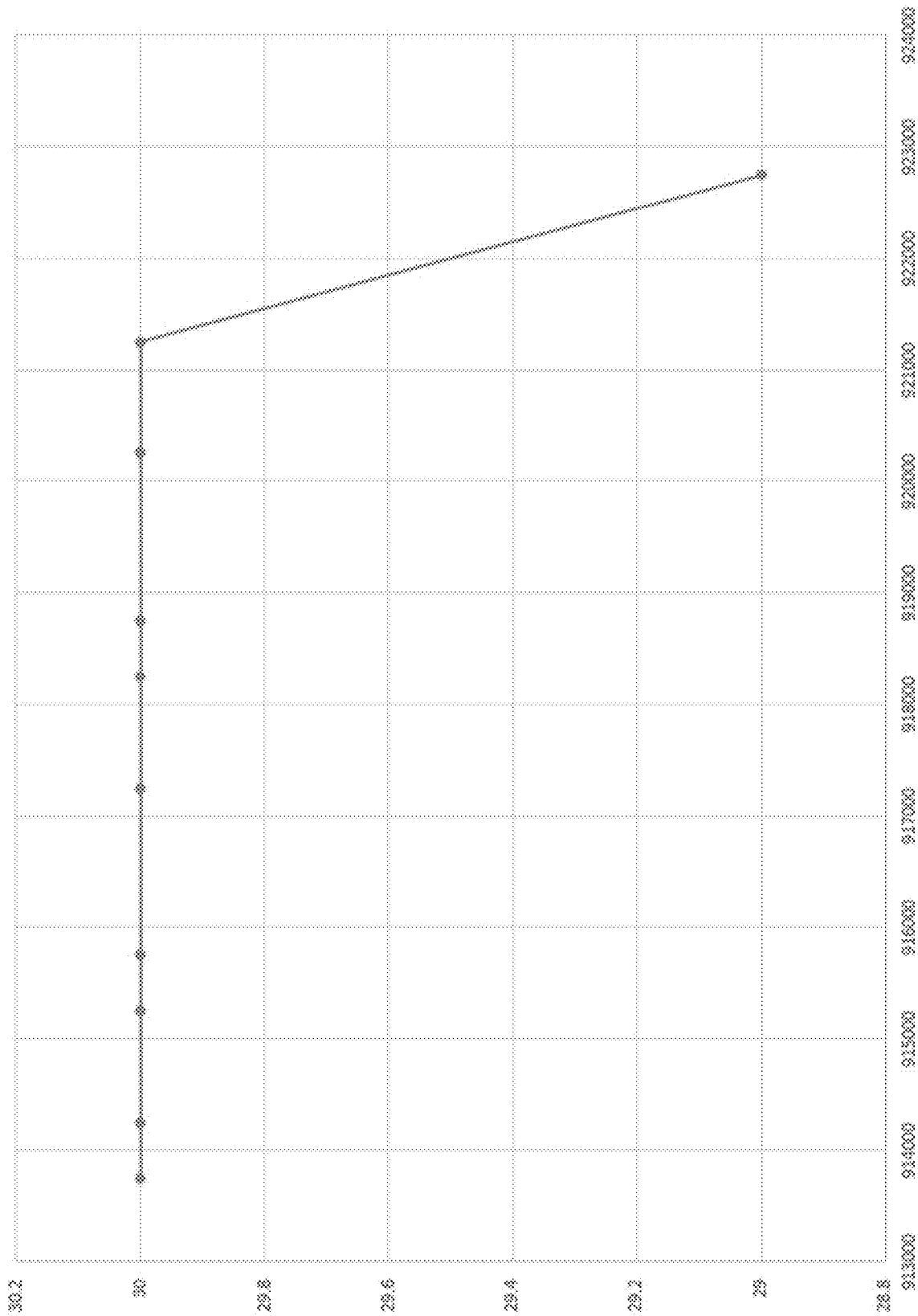

FIG. 7B is a plot of an exemplary RF tag calibration for detecting moisture using signals from a passive radio frequency (RF) tag in accordance with one or more embodiments of the present disclosure.

In some embodiments, dry state calibration only needs to be performed once during the installation or after the installation process is completed. This calibration may be performed for every single RF tag 101 that is applied. In some embodiments, to be able to detect moisture using the RF tag 101 return RF signals accurately, the first step is to determine the impedance value of the RF tag 101 at different frequencies and calculate linear regression, the results of which is recorded in a database and is the dry state linear regression function of the RF tag 101.

In some embodiments, the tag reader 102 reads the RF tag 101 with the different frequencies using a frequency hopping technique, including a series of reader RF signals at varying frequencies. FIG. 7B depicts an example of frequency hopping and the resulting impedance values from an example of the RF tag 101 using the frequency hopping techniques. In this example, the RF tag 101 is an S2 integrated circuit from RFMicron. In this example 913750 represents 913750 kHz. The impedance value is represented on the y-axis and is dependent on the frequency, represented on the x-axis, at which it is read. The impedance value has a linear relationship to the RF frequency of the reader RF signal and/or return RF signal. Thus, using the relationship between impedance and signal frequency, a linear regression can be calculated. Table 5 below represents the impedance values plotted against frequency in FIG. 7B:

TABLE 5

| Frequency (kHz) | Impedance value (Ohms) |
|---|---|
| 913750 | 30 |
| 914250 | 30 |
| 915250 | 30 |
| 915750 | 30 |
| 917250 | 30 |
| 918250 | 30 |
| 918750 | 30 |
| 920250 | 30 |
| 921250 | 30 |
| 922750 | 29 |

As described above, in some embodiments, the RF tag 101 may support the RSSI value from the RF tag's 101 perspective. Using the RSSI, the impedance values in the tag data 104 may be validated due to sufficient signal quality. Moreover, the RSSI may also be employed to determine a reader distance between the tag reader 102 and the RF tag 101. In some embodiments, the reader distance can be set to be in a range of, e.g., 6 to 10 feet, 4 to 12 feet, or other reader distance for a sufficient RSSI. In some embodiments, for an RSSI to be sufficient, the RSSI may be greater than of, e.g., −100 dBm, −50 dBm, −10 dBm, or other signal strength threshold tag reader 102 in some embodiments, when the tag reader 102 is within the reader distance of the RF tag 101, e.g., 6 to 10 feet, and/or the RSSI at the RF tag 101 is sufficient, e.g., greater than of, e.g., −100 dBm, −50 dBm, −10 dBm, or other signal strength threshold, then the impedance value seen at the RF tag 101 can be checked. In some embodiments, the impedance value seen at the RF tag 101 must fall within certain values for the linear regression to be calculated appropriately. Whether the impedance values fall within the appropriate range can be determined based on the R-squared value of the linear regression. If the R-squared value is high, e.g., above 0.7, the linear regression and resulting dry state linear regression function can be deemed to be successful.

In some embodiments, calculating a linear regression for the data of Table 5 above may result in a linear regression function having the following regression characteristics:

When analyzed for regression statistics based on the data of Table 5, the linear regression function may include the statistics of Table 7 below:

TABLE 7

| Regression Statistics | |
|---|---|
| Multiple R | 0.576774 |
| R Square | 0.332668 |
| Adjusted R Square | 0.249251 |
| Standard Error | 2639.181 |
| Observations | 10 |

In some embodiments, an R-squared value above, e.g., 0.7 indicates a successful dry state linear regression. Here, as shown in Table 7, the linear regression results in an R-squared value of 0.332668. As a result, a linear regression of the data of Table 5 provides an unsuccessful dry state linear regression function that does not successfully estimate the relationship between frequency and impedance of the RF tag 101 of Table 5.

In some embodiments, to further validate the linear regression of the data of Table 5, an analysis of variance (ANOVA) may be conducted. In some embodiments, the ANOVA results in data as shown in Table 8 below:

TABLE 8

| | df | SS | MS | F | Significance F |
|---|---|---|---|---|---|
| Regression | 1 | 27777778 | 27777778 | 3.988036 | 0.08089 |
| Residual | 8 | 55722222 | 6965278 | | |
| Total | 9 | 83500000 | | | |

Figure 8:
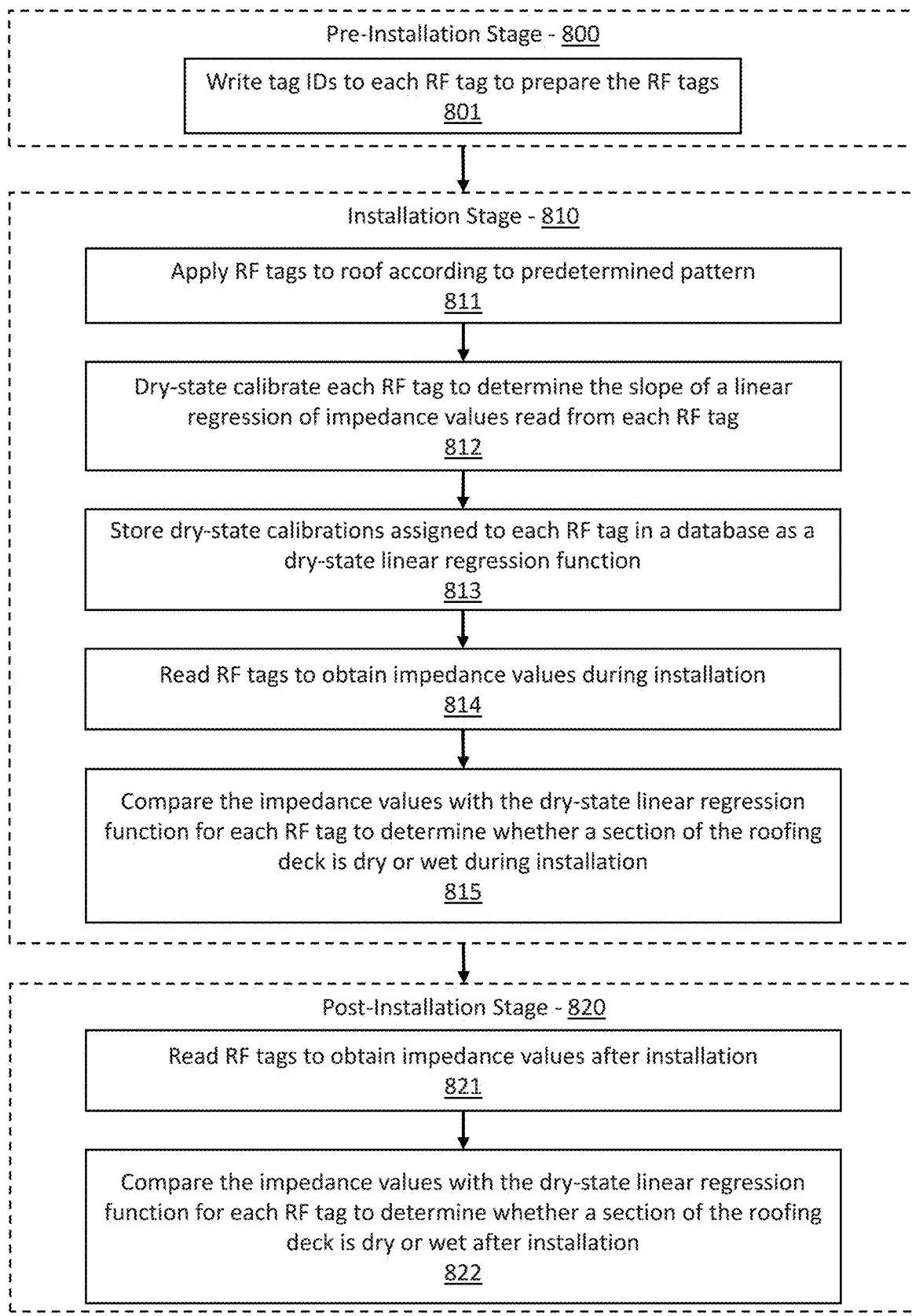

FIG. 8 illustrates a flowchart of an illustrative methodology for detecting moisture using signals from a passive radio frequency (RF) tag in accordance with one or more embodiments of the present disclosure.

In some embodiments, installation and use of RF tags, such as the RF tags 101 described above, may be performed in three states: a pre-installation stage 800, an installation stage 810, and a post-installation stage 820. Various functions and operations may be performed during one or more of these stages.

In some embodiments, the pre-installation stage 800 may include writing tag identifiers to each RF tag to prepare the RF tags at block 801. In some embodiments, the RF tags are prepared before installation and before they arrive at a construction location by writing into the Electronic Product Code memory (EPC) of the RF tag a globally unique tag identifier (e.g., unique across an entire organization) to each RF tag. This unique tag identifier may also be printed on the surface of the RF tag itself as a visual aid in the physical installation and application of the RF tag on the roof.

In some embodiments, a variety of methods can be used to apply RF tags to a rectangular surface. RF tags can be produced on a roll of tape in such a way that each RF tag is spaced evenly apart so that the application of the RF tag on

TABLE 6

| | Coefficients | Standard Error | t Stat | P-value | Lower 95% | Upper 95% | Lower 95.0% | Upper 95.0% |
|---|---|---|---|---|---|---|---|---|
| Alpha | 1083861 | 83184.23 | 13.02965 | 1.14E−06 | 892037.9 | 1275684 | 892037.9 | 1275684 |
| Beta | −5555.56 | 2781.941 | −1.99701 | 0.08089 | −11970.7 | 859.6126 | −11970.7 | 859.6126 | the roof is simply an unrolling of the tape. RF tags can be spaced per user requirements such as, e.g., 1 inch, 2 inches, 6 inches, 10 inches, 1 foot or other suitable spacing. The individual applying the RF tags to the roofing deck simply unrolls the tape. In some embodiments, another approach may include creating a material (e.g., silk or other fiber) mesh that can be simply spread out like a fishing net over a large surface. The RF tags are pre-affixed to such a net before installation. In some embodiments, another approach would be to embed the RF tags into the tar paper which is laid out on the residential roof before the shingles are applied.

In some embodiments, the installation stage 810 may include applying, at block 811, the RF tags to a roof in a predetermined pattern using the pre-installation preparation and a user or automated system to install a plurality of RF tags at a plurality of locations within a roof. In some embodiments, the RF tags are glued to the deck surface during the initial placement, e.g., upon layout of the tape, mesh or tar paper as described above, or adhered to the roof individually. In some embodiments, the RF tags may alternatively be applied to the individually to the roof deck by, e.g., adhering via glue, epoxy or other adhesive, in the predetermined pattern.

In some embodiments, the RF tags are installed as part of the roofing material. For example, each RF tag may be attached to the roofing material prior to the installation of the roofing material, for example, adhered to the underside of shingles, woven into or embedded in a roofing membrane, or other forms of attachment. The roofing material may then be laid down on the roof.

Accordingly, the RF tags may be situated between the roofing material and the roof deck to provide moisture detection under the roofing material. This arrangement enables the moisture detection using the RF tags to detect potential leaks, e.g., due to holes, cracks, seems, or other openings, in the roofing material that could potentially cause damage to the roof.

In some embodiments, the plurality of locations is identified according to a plurality of location identifiers, which may be stored in a database (e.g., database 112). Because of the way the RF tags are sequenced on the roof, a computing device 205 or 120, or moisture assessment server 110 can record the RF tag positions in the database and upon reading the RF tags later can determine precisely where each RF tag is on the surface.

In some embodiments, a moisture assessment server 110 or other computing device running a suitable software application may dry state calibrate each RF tag to determine the slope of a linear regression of impedance values read from each RF tag at block 812 of the installation stage 810. Dry state calibration may only be performed once during the installation or right after the installation process is completed. This dry state calibration may to be performed for every single RF tag that is applied. A handheld or a stationary RFID reader can be used to read the impedance value of each RF tag at different frequencies and calculate linear regressions, the results of which are recorded in the database with the tag identifier and location, and the dry state linear regression functions of each RF tag. The linear regression values may include alpha, beta and R-squared. Where the desired R-squared value is not achieved, the values are discarded and the calibration is started again. In some embodiments, the dry state linear regression functions may be kept for R-squared values equal to or greater than, e.g., 0.65, 0.7, 0.75, 0.8, 0.85, 0.9, 0.95, 0.97, 0.98, 0.99, etc.

In some embodiments, the dry state calibration for each RF tag is stored as assigned to each RF tag in the database as dry state linear regression functions and/or dry state linear regression function values at block 813 of the installation stage 810. Once an RF tag is applied to the roof, the linear regression values representing the dry state linear regression function are recorded in the database along with tag identifier including the EPC code, which uniquely identifies the RF tag. The EPC code is later used to determine the RF tag location on the roof itself.

In some embodiments, a reader may read RF tags to obtain impedance values during installation at block 814 of the installation stage 810. Each RF tag can be used to determine if there is moisture during the installation process. Each RF tag impedance value is read and compared against the known alpha and beta values stored in the database that are associated with each RF tag.

In some embodiments, the moisture assessment server 110 or other computing device with a suitable software application may compare the impedance values with the dry state linear regression function (e.g., using the alpha and beta values of the dry state linear regression function) for each of the RF tags to determine whether a section of the roofing deck is dry or wet during installation at block 815 of the installation stage 810.

If the difference that is calculated is greater than a predetermined deviation threshold representing an acceptable value, e.g., within plus or minus 10 Ohms, 15 Ohms, 17 Ohms, 18 Ohms, 20 Ohms, 22 Ohms, 25 Ohms, 5%, 10%, 12%, 13%, 15%, 16%, 17%, 20%, 25%, etc, of the dry-state linear regression function's value, moisture is assumed to be present. The calculation may be performed according to Equation 1 above where the frequency is the frequency at which the impedance value was read. In some embodiments, the deviation threshold maybe defined by the sensor manufacturer and an appropriate test in the lab which is done only once.

Post-installation stage 820 may include reading RF tags to obtain impedance values during installation at block 821. The RF tag can be used to determine if there is moisture at any time after the installation process has been completed. The RF tag impedance value is read and compared against the known alpha and beta values stored in the database.

The impedance values may be compared with values of the dry state linear regression function (e.g., the alpha and beta values) for each of the RF tags to determine whether a section of the roofing deck is dry or not during installation at block 822 of the post-installation stage 820. After the installation is done, the RF tag can be read by an RF reader to determine if there is moisture present. The RF tag's impedance value is read and compared against the known alpha and beta values stored in the database. Similar to the comparison during installation, if the difference that is calculated is greater than a predetermined deviation threshold, moisture is assumed to be present. The calculation may be performed according to Equation 1 above where the frequency is the frequency at which the impedance value was read.

Figure 9:
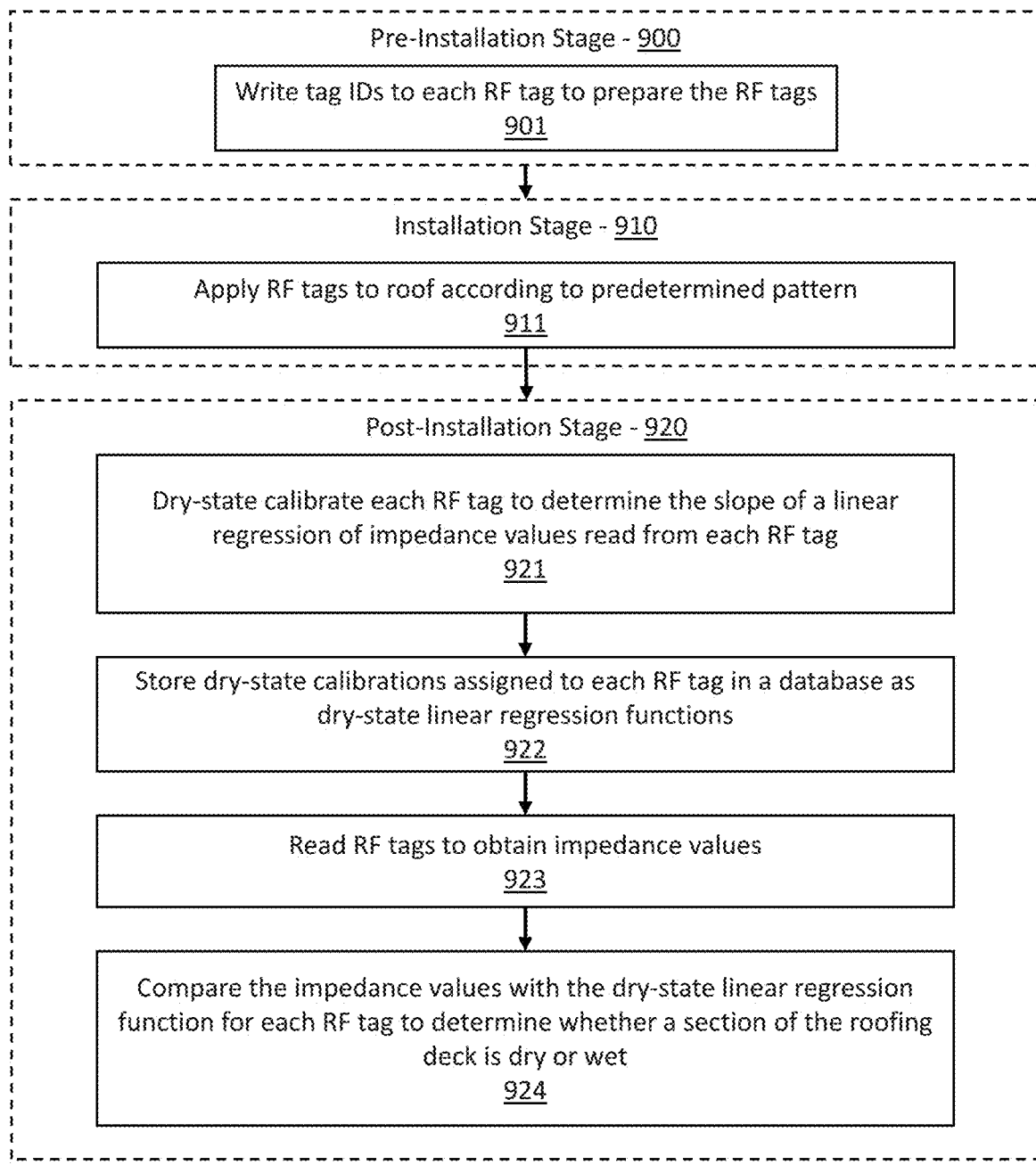

FIG. 9 illustrates a flowchart of another illustrative methodology for detecting moisture using signals from a passive radio frequency (RF) tag in accordance with one or more embodiments of the present disclosure.

In some embodiments, installation and use of RF tags, such as the RF tags 101 described above, may be performed in three states: a pre-installation stage 900, an installation stage 910, and a post-installation stage 920. Various functions and operations may be performed during one or more of these stages.

In some embodiments, the pre-installation stage 900 may include writing tag identifiers to each RF tag to prepare the RF tags at block 901. In some embodiments, the RF tags are prepared before installation and before they arrive at a construction location by writing into the Electronic Product Code memory (EPC) of the RF tag a globally unique tag identifier (e.g., unique across an entire organization) to each RF tag. This unique tag identifier may also be printed on the surface of the RF tag itself as a visual aid in the physical installation and application of the RF tag on the roof.

In some embodiments, a variety of methods can be used to apply the RF tags to a rectangular surface. The RF tags can be produced on a roll of tape in such a way that each RF tag is spaced evenly apart so that the application of the RF tag on the roof is simply an unrolling of the tape. RF tags can be spaced per user requirements such as, e.g., 1 inch, 2 inches, 6 inches, 10 inches, 1 foot or other suitable spacing. The individual applying the RF tags to the roofing deck simply unrolls the tape. In some embodiments, another approach may include creating a material (e.g., silk or other fiber) mesh that can be simply spread out like a fishing net over a large surface. The RF tags are pre-affixed to such a net before installation. In some embodiments, another approach would be to embed the RF tags into the tar paper which is laid out on the residential roof before the shingles are applied.

In some embodiments, the installation stage 910 may include applying, at block 911, the RF tags to roof in a predetermined pattern using the pre-installation preparation and a user or automated system, at block 911 to install a plurality of RF tags at a plurality of locations within a roof. In some embodiments, the RF tags are glued to the deck surface during the initial placement, e.g., upon layout of the tape, mesh or tar paper as described above, or adhered to the roof individually. In some embodiments, the RF tags may alternatively be applied to the individually to the roof deck by, e.g., adhering via glue, epoxy or other adhesive, in the predetermined pattern.

In some embodiments, each RF tag is installed as part of the roofing material. For example, each RF tag may be attached to the roofing material prior to the installation of the roofing material, for example, adhered to the underside of shingles, woven into or embedded in a roofing membrane, or other forms of attachment. The roofing material may then be laid down on the roof.

Accordingly, each RF tag may be situated between the roofing material and the roof deck to provide moisture detection under the roofing material. This arrangement enables the moisture detection using the RF tags to detect potential leaks, e.g., due to holes, cracks, seems, or other openings, in the roofing material that could potentially cause damage to the roof.

In some embodiments, the post-installation stage 920 may include a moisture assessment server 110 or other computing device running a suitable software application to dry state calibrate each RF tag to determine the slope of a linear regression of impedance values read from each RF tag at block 921. Dry state calibration may only be performed once during the installation or right after the installation process is completed. This dry state calibration may to be performed for every single RF tag that is applied. A handheld or a stationary RFID reader can be used to read the impedance value of each RF tag at different frequencies and calculate linear regressions, the results of which are recorded in the database with the tag identifier and location of each associated RF tag, and are the dry state linear regression functions of each RF tag. The linear regression values may include alpha, beta and R-squared. Where the desired R-squared value is not achieved the values are discarded and the calibration is started again. In some embodiments, the dry state linear regression function may be kept for R-squared values equal to or greater than, e.g., 0.7.

In some embodiments, the dry state calibration for each RF tag is stored as assigned to each RF tag in the database as dry state linear regression functions at block 922 of the post-installation stage 920. Once each RF tag is applied to the roof, the linear regression value representing each dry state linear regression function are recorded in the database along with associated tag identifier including the EPC code, which uniquely identifies the associated RF tag. The tag identifiers are later used to determine each RF tag location on the roof itself.

In some embodiments, one or more RF tags may be read to obtain impedance values at block 923 of the post-installation stage 920. The RF tag can be used to determine if there is moisture at any time after the installation process has been completed. The RF tag impedance value is read and compared against the known alpha and beta values stored in the database.

In some embodiments, the moisture assessment server 110 or other computing device with a suitable software application may compare the impedance values with the dry state linear regression function (e.g., using the alpha and beta values of the dry state linear regression function) for each of the RF tags to determine whether a section of the roofing deck is dry or wet at block 924 of the post-installation stage 920. An RF tag's impedance value is read and compared against the known alpha and beta values stored in the database. If the difference that is calculated is greater than a deviation threshold, such as within plus or minus 15 of the dry-state linear regression function's value, moisture is determined to be present. The calculation may be performed according to Equation 1 above where the frequency is the frequency at which the impedance value was read.

FIG. 10 illustrates a flowchart of an illustrative methodology calibrating RF tags for detecting moisture using signals from a passive radio frequency (RF) tag in accordance with one or more embodiments of the present disclosure.

In some embodiments, calibration of each tag (e.g., blocks 812 and/or 921 above) may include causing a tag interrogator to interrogate, using multiple reader radio frequency (RF) signals, a radio frequency (RF) tag located at a location of a roof to receive corresponding multiple response RF signals at block 1001, including at least a first reader RF signal and a second reader RF signal with corresponding first response RF signal and second response RF signal. A first impedance value of the RF tag may then be obtained from the first response RF signal at the first frequency at block 1002. A second impedance value of the RF tag from may be obtained the second response RF signal at the second frequency at block 1003. A dry state linear regression function of the RF tag may then be determined based on a linear regression analysis of the first impedance value and the second impedance value at block 1004. In some embodiments, the dry state linear regression function associated with the RF tag and the location identifier of the location of the roof is stored in the database at block 1005.

FIG. 11 illustrates a flowchart of an illustrative methodology using RF tag calibrations to detect moisture from tag readings in accordance with one or more embodiments of the present disclosure.

In some embodiments, the determination of whether a section of a roofing deck is dry or wet (e.g., blocks 822 and/or 924 above) may include causing a tag reader to read, by a radio frequency (RF) reader RF signal at a frequency, a radio frequency (RF) tag located at a location of a roof to receive and return RF signal from the RF tag at block 1101. The tag data may be received at block 1102, and based on a tag identifier of the tag data, the location of the roof associated with the RF tag may be determined at block 1103. A dry state linear regression function associated the tag identifier of the RF tag may be obtained, at block 1104. In some embodiments, to determine a wet state or a dry state of the roof at the location associated with the RF tag, an impedance value of the RF tag and the dry state linear regression function of the RF tag may be compared at block 1105. In some embodiments, an indicator of the wet state or the dry state of the roof at the location may be output at block 1106 based on the comparison the impedance value and the dry state linear regression function.

Figure 12:
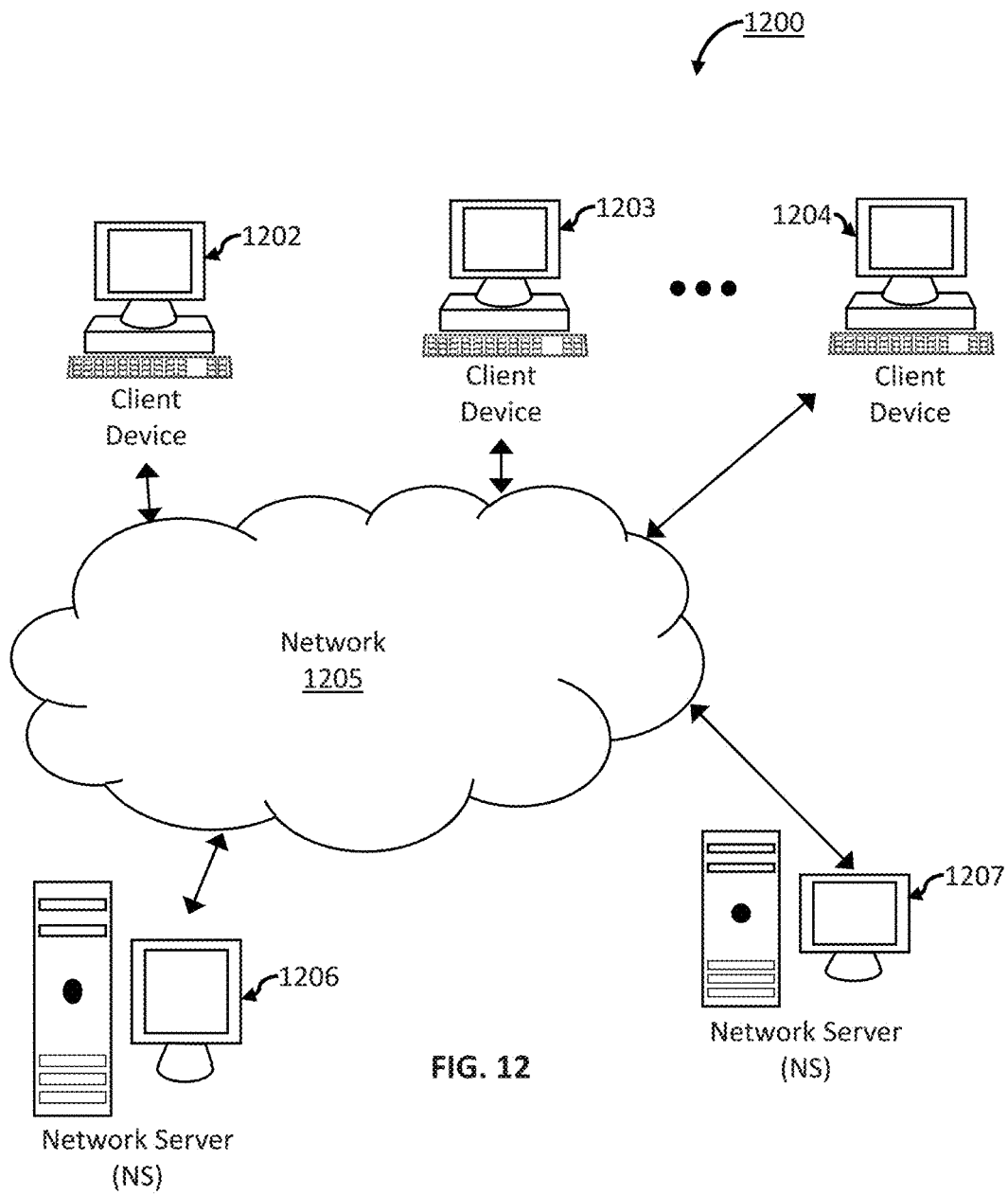

FIG. 12 depicts a block diagram of an exemplary computer-based system and platform 1200 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 1200 may be configured to manage a large number of members and concurrent transactions, as detailed herein. In some embodiments, the exemplary computer-based system and platform 1200 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 12, members 1202-1204 (e.g., clients) of the exemplary computer-based system and platform 1200 may include virtually any computing device capable of receiving and sending a message over a network (e.g., cloud network), such as network 1205, to and from another computing device, such as servers 1206 and 1207, each other, and the like. In some embodiments, the member devices 1202-1204 may be personal computers, multiprocessor systems, microprocessor-based or programmable consumer electronics, network PCs, and the like. In some embodiments, one or more member devices within member devices 1202-1204 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 1202-1204 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 1202-1204 may include may run one or more applications, such as Internet browsers, mobile applications, voice calls, video games, videoconferencing, and email, among others. In some embodiments, one or more member devices within member devices 1202-1204 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 1202-1204 may be specifically programmed by either Java, .Net, QT, C, C++ and/or other suitable programming language. In some embodiments, one or more member devices within member devices 1202-1204 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 1205 may provide network access, data transport and/or other services to any computing device coupled to it. In some embodiments, the exemplary network 1205 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 1205 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 1205 may include and implement, as an alternative or in conjunction with one or more of the above, a WiMAX architecture defined by the WiMAX forum. In some embodiments and, optionally, in combination of any embodiment described above or below, the exemplary network 1205 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 1205 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 1205 may also include mass storage, such as network attached storage (NAS), a storage area network (SAN), a content delivery network (CDN) or other forms of computer or machine readable media.

In some embodiments, the exemplary server 1206 or the exemplary server 1207 may be a web server (or a series of servers) running a network operating system, examples of which may include but are not limited to Microsoft Windows Server, Novell NetWare, or Linux. In some embodiments, the exemplary server 1206 or the exemplary server 1207 may be used for and/or provide cloud and/or network computing. Although not shown in FIG. 12, in some embodiments, the exemplary server 1206 or the exemplary server 1207 may have connections to external systems like email, SMS messaging, text messaging, ad content providers, etc. Any of the features of the exemplary server 1206 may be also implemented in the exemplary server 1207 and vice versa.

In some embodiments, one or more of the exemplary servers 1206 and 1207 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 1201-1204.

In some embodiments and, optionally, in combination of any embodiment described above or below, for example, one or more exemplary computing member devices 1202-1204, the exemplary server 1206, and/or the exemplary server 1207 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 13:
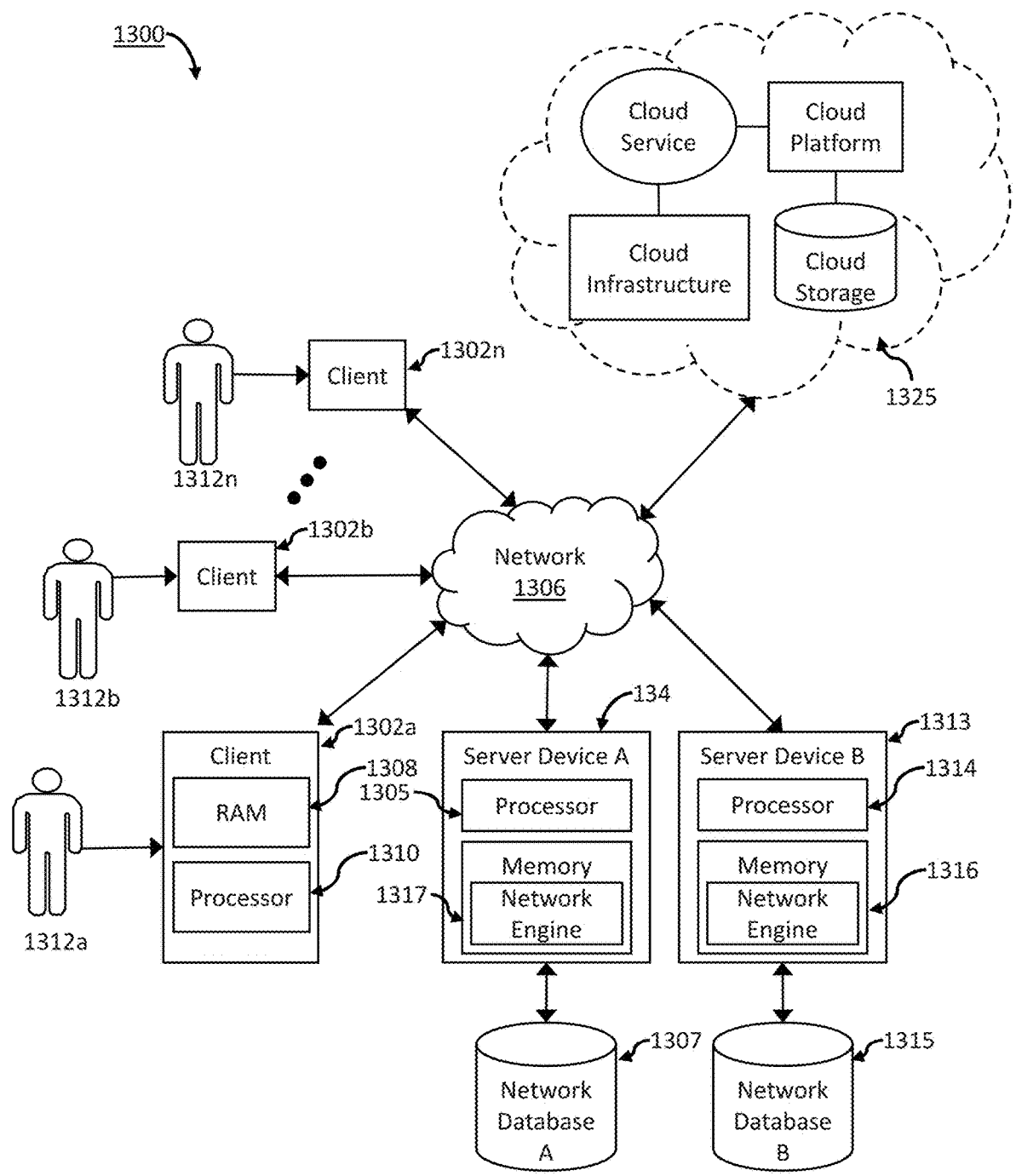

FIG. 13 depicts a block diagram of another exemplary computer-based system and platform 1300 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 1302a, 1302b thru 1302n shown each at least includes a computer-readable medium, such as a random-access memory (RAM) 1308 coupled to a processor 1310 or FLASH memory. In some embodiments, the processor 1310 may execute computer-executable program instructions stored in memory 1308. In some embodiments, the processor 1310 may include a microprocessor, an ASIC, and/or a state machine. In some embodiments, the processor 1310 may include, or may be in communication with, media, for example computer-readable media, which stores instructions that, when executed by the processor 1310, may cause the processor 1310 to perform one or more steps described herein. In some embodiments, examples of computer-readable media may include, but are not limited to, an electronic, optical, magnetic, or other storage or transmission device capable of providing a processor, such as the processor 1310 of client 1302a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 1302a through 1302n may also comprise a number of external or internal devices such as a mouse, a CD-ROM, DVD, a physical or virtual keyboard, a display, or other input or output devices. In some embodiments, examples of member computing devices 1302a through 1302n (e.g., clients) may be any type of processor-based platforms that are connected to a network 1306 such as, without limitation, personal computers, digital assistants, personal digital assistants, smart phones, pagers, digital tablets, laptop computers, Internet appliances, and other processor-based devices. In some embodiments, member computing devices 1302a through 1302n may be specifically programmed with one or more application programs in accordance with one or more principles/methodologies detailed herein. In some embodiments, member computing devices 1302a through 1302n may operate on any operating system capable of supporting a browser or browser-enabled application, such as Microsoft™, Windows™, and/or Linux. In some embodiments, member computing devices 1302a through 1302n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 1302a through 1302n, users, 1312a through 1302n, may communicate over the exemplary network 1306 with each other and/or with other systems and/or devices coupled to the network 1306. As shown in FIG. 13, exemplary server devices 1304 and 1313 may be also coupled to the network 1306. In some embodiments, one or more member computing devices 1302a through 1302n may be mobile clients.

In some embodiments, at least one database of exemplary databases 1307 and 1315 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 14:
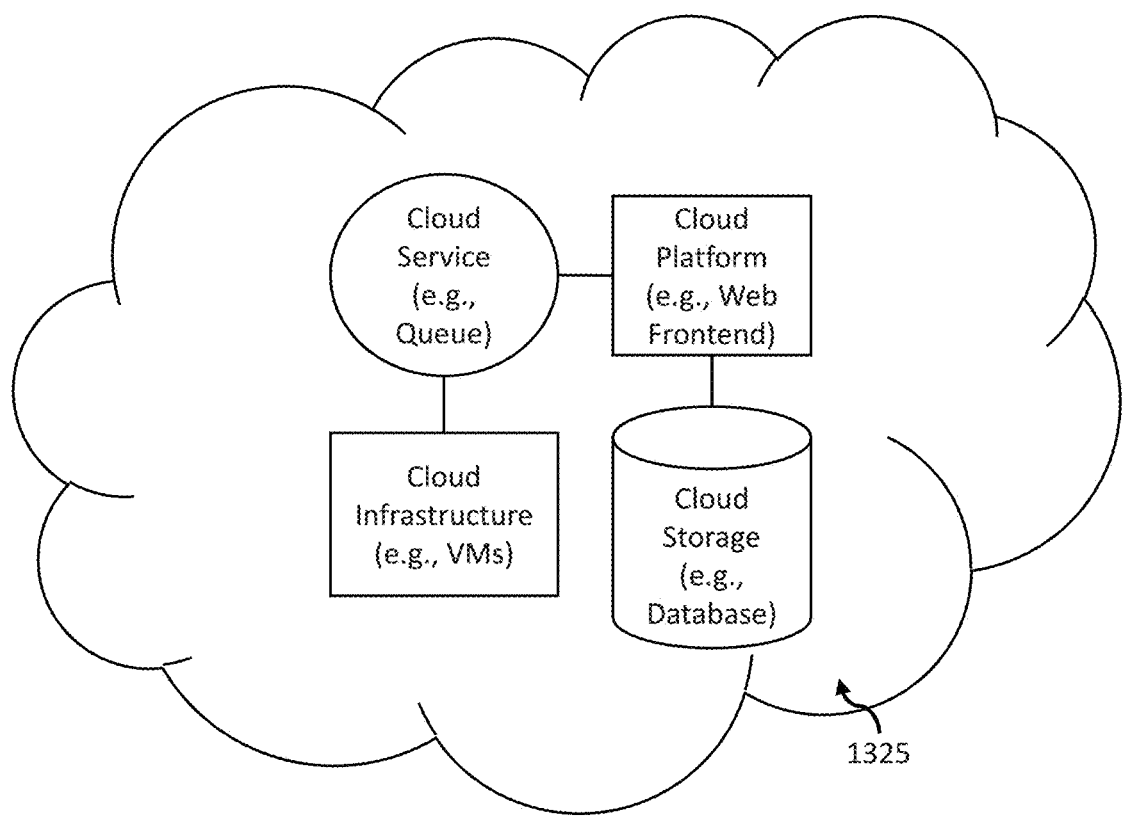
Figure 15:
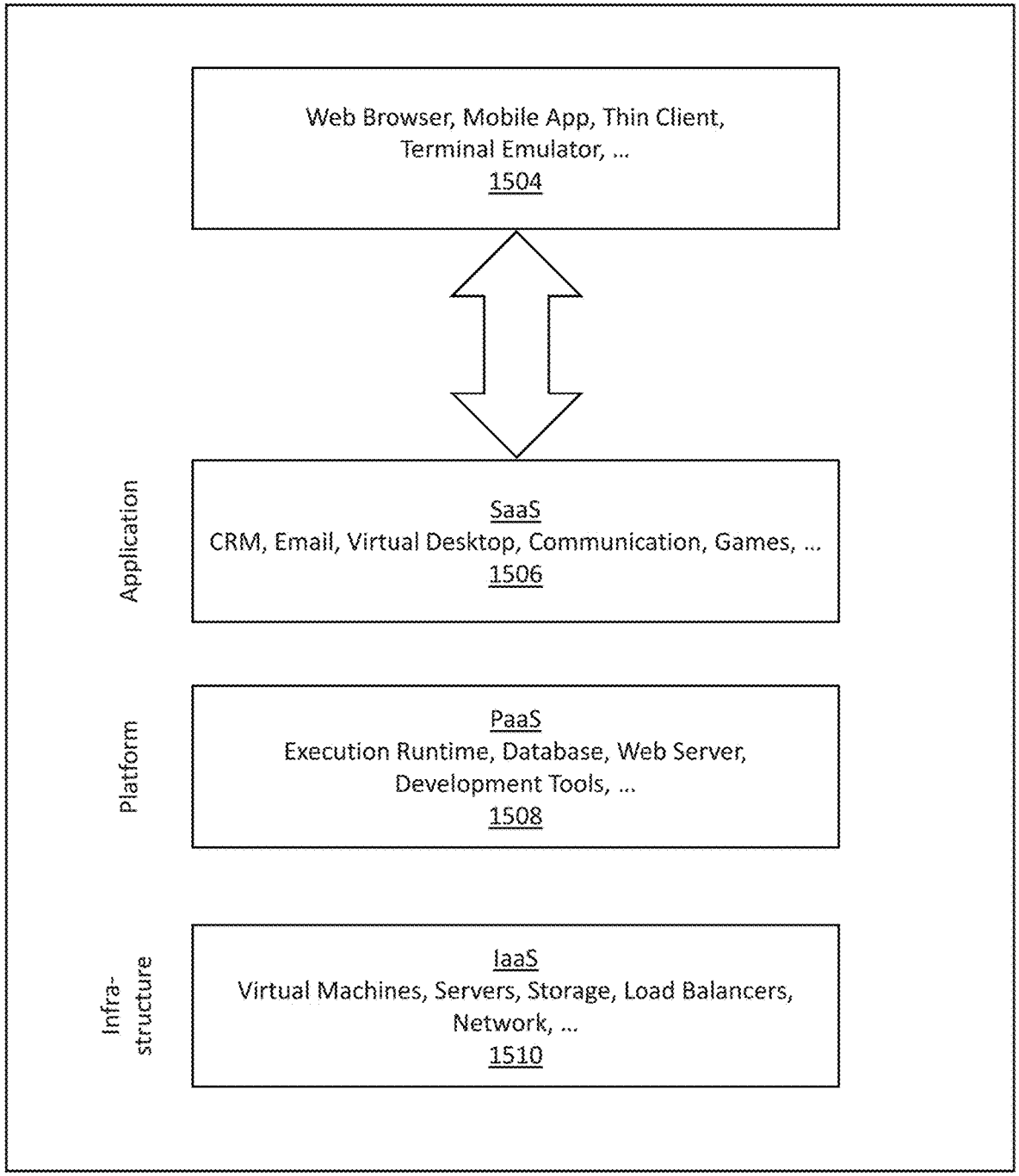

In some embodiments, the exemplary inventive computer-based systems/platforms, the exemplary inventive computer-based devices, and/or the exemplary inventive computer-based components of the present disclosure may be specifically configured to operate in a cloud computing/architecture 1325 such as, but not limiting to: infrastructure a service (IaaS) 1510, platform as a service (PaaS) 1508, and/or software as a service (SaaS) 1506 using a web browser, mobile app, thin client, terminal emulator or other endpoint 1504. FIGS. 14 and 15 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

Figure 16:
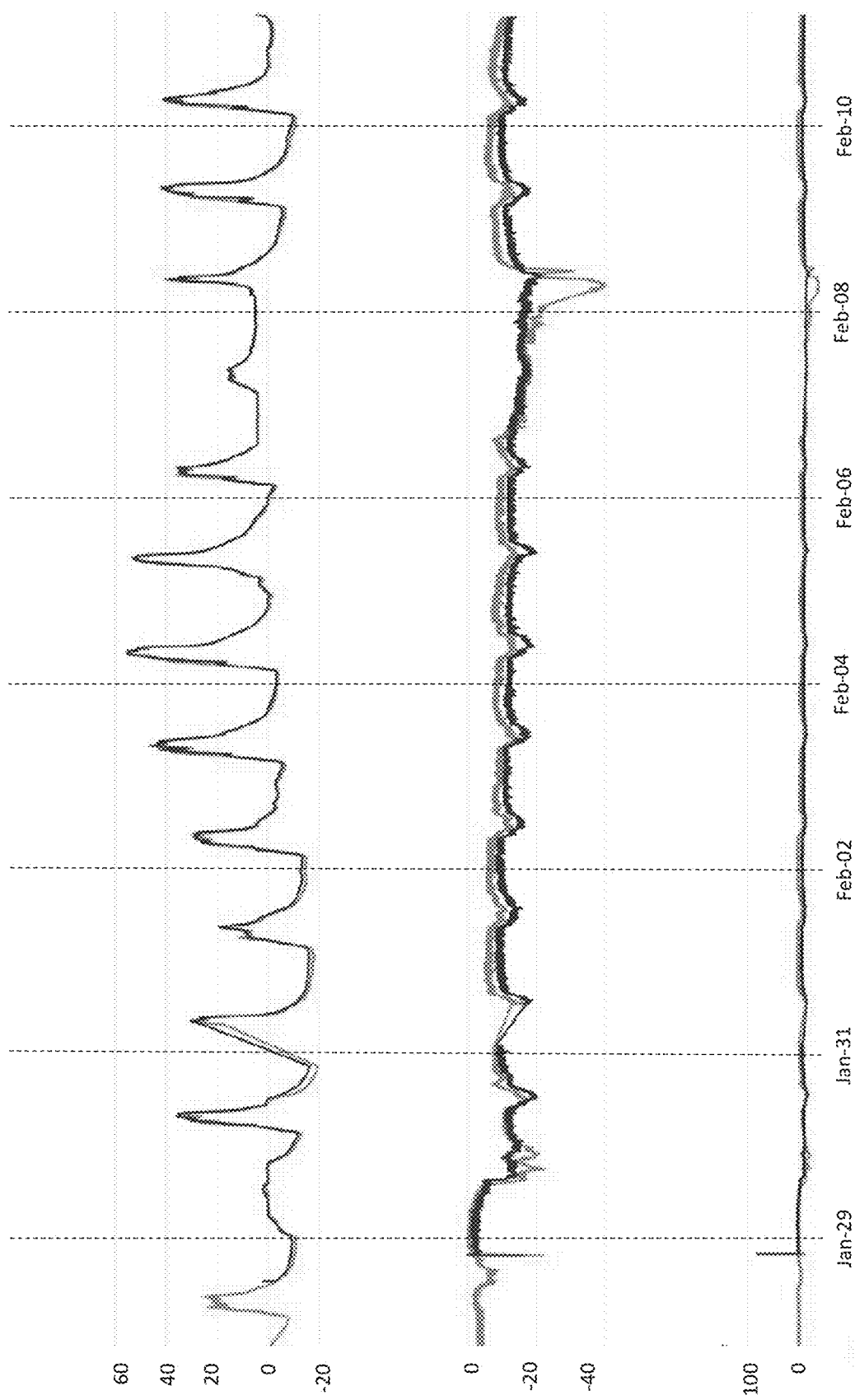

FIG. 16 is a plot of example RF tag data for RF tags 101 monitored via a tag reader 102 over a period of time for detecting moisture using the tag data in accordance with one or more embodiments of the present disclosure.

Moisture state of an RF tag 101 was recorded in a database (e.g., database 112) and monitored continuously over a several month period. The results of the monitoring are depicted in FIG. 16, where the top graph represents temperature fluctuations and the middle graph represents impedance value fluctuations, and the bottom graph represent moisture variations according to the impedance values and the dry state calibration of the RF tag 101.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses:

Clause 1. A system comprising:
  a plurality of radio frequency (RF) tags;
    wherein the plurality of RF tags is positioned at a plurality of locations throughout a roof;
    wherein a plurality of location identifiers for the plurality of locations is stored in a database in communication with a computing device;
  at least one tag reader configured to:
    generate at least one reader RF signal at one or more frequencies to read the plurality of RF tags, and
    detect at least one return RF signal from at least one RF tag of the plurality of RF tags;
      wherein the at least one return RF signal of the at least one RF tag carries tag data comprising at least one impedance value and at least one tag identifier;
      wherein the at least one tag identifier is associated with a corresponding location identifier of the plurality of location identifiers in the database;
  at least one processor of the computing device;
    wherein the at least one processor is programmed to:
      receive the tag data;
      determine, based on the at least one tag identifier of the tag data and from the database, a corresponding location of the at least one RF tag from the plurality of locations;
      obtain at least one dry state linear regression function associated with the at least one tag identifier of the at least one RF tag;
      determine a wet state or dry state of the roof at the corresponding location associated with the at least one RF tag based, at least in part, on:
        i) the at least one impedance value of the at least one RF tag and
        ii) the at least one dry state linear regression function of the at least one RF tag; and
      output an indicator of the wet state or the dry state of the roof at the corresponding location.

Clause 2. The system as recited in clause 1, wherein the at least one processor is further configured to:
  determine, based at least in part on the at least one dry state linear regression function, at least one deviation of the at least one impedance value of the at least one RF tag; and
  determine the wet state or the dry state based on the deviation.

Clause 3. The system of clause 1, wherein each location of the plurality of locations has a distance between 0.1 inches and 10 inches.

Clause 4. The system of clause 1, wherein the plurality of RF tags is arranged in a pre-determined pattern.

Clause 5. The system of clause 4, wherein the pre-determined pattern is a square grid.

Clause 6. The system of clause 1, wherein the indicator of the wet state comprises an indication of at least one characteristic of a moisture content at the corresponding location of the roof.

Clause 7. The system of clause 1, wherein the at least one tag reader is at least one Internet-of-Things device that is:
   i) located within a building structure having the roof and
   ii) configured to upload, over a computer network, the tag data to a moisture assessment server; and
   wherein the computing device is the moisture assessment server.

Clause 8. A method comprising:
   causing, by at least one processor of at least one computing device, at least one tag reader to read, by at least one reader radio frequency (RF) signal at one or more frequencies, at least one RF tag located at a corresponding location of a roof to receive at least one return RF signal from the at least one RF tag;
      wherein the at least one return RF signal of the at least one RF tag encodes tag data comprising at least one impedance value and at least one tag identifier;
      wherein the at least one tag identifier of the at least one RF tag is associated with the corresponding location in a database in communication with the at least one computing device;
   receiving, by the at least one processor, the tag data;
   determining, by the at least one processor, based on the at least one tag identifier of the tag data and from the database, the corresponding location of the roof associated with the at least one RF tag;
   obtaining, by the at least one processor, at least one dry state linear regression function associated the at least one tag identifier of the at least one RF tag;
   determining, by the at least one processor, a wet state or a dry state of the roof at the corresponding location associated with the at least one RF tag based, at least in part, on the at least one impedance value of the at least one RF tag and the at least one dry state linear regression function of the at least one RF tag, and
   outputting, by the at least one processor, an indicator of the wet state or the dry state of the roof at the at least one corresponding location.

Clause 9. The method as recited in clause 8, further comprising:
   determining, by the at least one processor, based at least in part on the at least one dry state linear regression function, at least one deviation of the at least one impedance value of the at least one RF tag; and
   determining, by the at least one processor, the wet state or the dry state based on the at least one deviation.

Clause 10. The method of clause 8, wherein the corresponding location has a distance between 0.1 inches and 10 inches.

Clause 11. The method of clause 8, wherein the at least one processor is a processor of an Internet-of-Things device that is:
   i) located within a building structure having the roof and
   ii) configured to upload the first impedance value and the second impedance value to a moisture assessment server.

Clause 12. A method comprising:
   causing, by at least one processor, at least one tag reader to read, by a plurality of reader radio frequency (RF) signals, at least one RF tag located at a corresponding location of a roof to receive a plurality of response RF signals;
      wherein the plurality of reader RF signals comprise:
         i) a first reader RF signal at a first frequency, and
         ii) a second reader RF signal at a second frequency;
      wherein the plurality of response RF signals comprise:
         i) a first response signal at the first frequency in response to the first reader RF signal, and
         ii) a second response signal at the second frequency in response to the second reader RF signal;
         wherein the second frequency is different from the first frequency;
      wherein a location identifier of the corresponding location is stored in a database;
   obtaining, by the at least one processor, a first impedance value of the at least one RF tag from the first response RF signal at the first frequency;
   obtaining, by the at least one processor, a second impedance value of the at least one RF tag from the second response RF signal at the second frequency;
   determining, by the at least one processor, a dry state linear regression function of the at least one RF tag based on a linear regression analysis of the first impedance value and the second impedance value; and
   storing, by the at least one processor, the dry state linear regression function associated with the at least one RF tag and the location identifier of the corresponding location of the roof in the database.

Clause 13. The method of clause 12, wherein the at least one tag reader is at least one Internet-of-Things device that is:
   i) located within a building structure having the roof and
   ii) configured to upload the tag data to a moisture assessment server.

Clause 14. A method comprising:
   installing a plurality of radio frequency (RF) tags at a plurality of locations within a roof;
      wherein a plurality of location identifiers for the plurality of locations is stored in a database;
   providing at least one tag reader that is programmed to:
      generate at least one reader RF signal at one or more frequencies to read the plurality of RF tags;
      detect at least one return RF signal from at least one RF tag of the plurality of RF tags;
      wherein the at least one return RF signal of the at least one RF tag encodes tag data comprising at least one impedance value and at least one tag identifier;
      wherein the at least one tag identifier is associated with a corresponding location identifier of the plurality of location identifiers in the database;
   providing software instructions for execution by at least one processor, wherein the software instructions cause the at least one processor to:
   receive the tag data;
      determine, based on the at least one tag identifier of the tag data and from the database, a corresponding location of the at least one RF tag from the plurality of locations;
      obtain at least one dry state linear regression function associated with the at least one tag identifier of the at least one RF tag;
      determine a wet state or a dry state of the roof at the corresponding location associated with the at least one RF tag based, at least in part, on:
         i) the at least one impedance value of the at least one RF tag and
         ii) the at least one dry state linear regression function of the at least one RF tag; and
      output an indicator of the wet state or the dry state of the roof at the corresponding location.

Clause 15. The method as recited in clause 14, wherein the at least one processor is further configured to:
  determine, based at least in part on the at least one dry state linear regression function, at least one deviation of the at least one impedance value of the at least one RF tag; and
  determine the wet state or the dry state based on the deviation.

Clause 16. The method of clause 14, wherein each location of the plurality of locations has a distance between 0.1 inches and 10 inches.

Clause 17. The method of clause 14, wherein the plurality of RF tags is arranged in a pre-determined pattern.

Clause 18. The method of clause 17, wherein the pre-determined pattern is a square grid.

Clause 19. The method of clause 14, wherein the indicator of the wet state comprises an indication of at least one characteristic of a moisture content at the corresponding location of the roof.

Clause 20. The method of clause 14, wherein the at least one tag reader is at least one Internet-of-Things device that is:
  i) located within a building structure having the roof and
  ii) configured to upload the tag data to a moisture assessment server; and
  wherein the moisture assessment server comprises the at least one processor.

At least some aspects of the present disclosure will now be described with reference to the following numbered clauses:

Clause 1. A system comprising:
  a plurality of radio frequency (RF) tags;
    wherein the plurality of RF tags is positioned at a plurality of locations throughout a roof;
    wherein a plurality of location identifiers for the plurality of locations is stored in a database in communication with a computing device;
  at least one tag reader configured to:
    generate at least one reader RF signal at one or more frequencies to read the plurality of RF tags, and
    detect at least one return RF signal from at least one RF tag of the plurality of RF tags;
      wherein the at least one return RF signal of the at least one RF tag carries tag data comprising at least one impedance value and at least one tag identifier;
      wherein the at least one tag identifier is associated with a corresponding location identifier of the plurality of location identifiers in the database;
  at least one processor of the computing device;
    wherein the at least one processor is programmed to:
      receive the tag data;
      determine, based on the at least one tag identifier of the tag data and from the database, a corresponding location of the at least one RF tag from the plurality of locations;
      obtain at least one dry state linear regression function associated with the at least one tag identifier of the at least one RF tag;
      determine a wet state or dry state of the roof at the corresponding location associated with the at least one RF tag based, at least in part, on:
        i) the at least one impedance value of the at least one RF tag and
        ii) the at least one dry state linear regression function of the at least one RF tag; and
      output an indicator of the wet state or the dry state of the roof at the corresponding location.

Clause 2. A method comprising:
  causing, by at least one processor of at least one computing device, at least one tag reader to read, by at least one reader radio frequency (RF) signal at one or more frequencies, at least one radio frequency (RF) tag located at a corresponding location of a roof to receive at least one return RF signal from the at least one RF tag;
    wherein the at least one return RF signal of the at least one RF tag encodes tag data comprising at least one impedance value and at least one tag identifier;
    wherein the at least one tag identifier of the at least one RF tag is associated with the corresponding location in a database in communication with the at least one computing device;
  receiving, by the at least one processor, the tag data;
  determine, based on the at least one tag identifier of the tag data and from the database, the corresponding location of the roof associated with the at least one RF tag;
  obtaining, by the at least one processor, at least one dry state linear regression function associated the at least one tag identifier of the at least one RF tag;
  determining, by the at least one processor, a wet state or a dry state of the roof at the corresponding location associated with the at least one RF tag based, at least in part, on the at least one impedance value of the at least one RF tag and the at least one dry state linear regression function of the at least one RF tag, and
  outputting, by the at least one processor, an indicator of the wet state or the dry state of the roof at the at least one corresponding location.

Clause 3. A method comprising:
  causing, by at least one processor, at least one tag reader to read, by a plurality of reader radio frequency (RF) signals, at least one radio frequency (RF) tag located at a corresponding location of a roof to receive a plurality of response RF signals;
    wherein the plurality of reader RF signals comprise:
      i) a first reader RF signal at a first frequency, and
      ii) a second reader RF signal at a second frequency;
    wherein the plurality of response RF signals comprise:
      i) a first response signal at the first frequency in response to the first reader RF signal, and
      ii) a second response signal at the second frequency in response to the second reader RF signal;
      wherein the second frequency is different from the first frequency;
    wherein a location identifier of the corresponding location is stored in a database;
  obtaining, by the at least one processor, a first impedance value of the at least one RF tag from the first response RF signal at the first frequency;
  obtaining, by the at least one processor, a second impedance value of the at least one RF tag from the second response RF signal at the second frequency;
  determining, by the at least one processor, a dry state linear regression function of the at least one RF tag based on a linear regression analysis of the first impedance value and the second impedance value; and
  storing, by the at least one processor, the dry state linear regression function associated with the at least one RF tag and the location identifier of the corresponding location of the roof in the database.

Clause 4. A method comprising:
  installing a plurality of radio frequency (RF) tags at a plurality of locations within a roof;

wherein a plurality of location identifiers for the plurality of locations is stored in a database;
providing at least one tag reader that is programmed to:
generate at least one reader RF signal at one or more frequencies to read the plurality of RF tags;
detect at least one return RF signal from at least one RF tag of the plurality of RF tags;
wherein the at least one return RF signal of the at least one RF tag encodes tag data comprising at least one impedance value and at least one tag identifier;
wherein the at least one tag identifier is associated with a corresponding location identifier of the plurality of location identifiers in the database;
providing software instructions for execution by at least one processor, wherein the software instructions cause the at least one processor to:
receive the tag data;
determine, based on the at least one tag identifier of the tag data and from the database, a corresponding location of the at least one RF tag from the plurality of locations;
obtain at least one dry state linear regression function associated with the at least one tag identifier of the at least one RF tag;
determine a wet state or a dry state of the roof at the corresponding location associated with the at least one RF tag based, at least in part, on:
i) the at least one impedance value of the at least one RF tag and
ii) the at least one dry state linear regression function of the at least one passive RFID tag; and
output an indicator of the wet state or the dry state of the roof at the corresponding location.

Clause 5. The systems and methods of any of clauses 1-4, wherein the at least one processor is further configured to:
determine, based at least in part on the at least one dry state linear regression function, at least one deviation of the at least one impedance value of the at least one RF tag; and
determine the wet state or the dry state based on the deviation.

Clause 6. The systems and methods of any of clauses 1-4, wherein each location of the plurality of locations has a distance between 0.1 inches and 10 inches.

Clause 7. The systems and methods of any of clauses 1-4, wherein the plurality of RF tags is arranged in a pre-determined pattern.

Clause 8. The systems and methods of clause 7, wherein the pre-determined pattern is a square grid.

Clause 9. The systems and methods of any of clauses 1-4, wherein the indicator of the wet state comprises an indication of at least one characteristic of a moisture content at the corresponding location of the roof.

Clause 10. The systems and methods of any of clauses 1-4, wherein the at least one tag reader is at least one Internet-of-Things device that is:
i) located within a building structure having the roof and
ii) configured to upload, over a computer network, the tag data to a moisture assessment server; and
wherein the computing device is the moisture assessment server.

Clause 11. The systems and methods of any of clauses 1-4, wherein the at least one processor is a processor of an Internet-of-Things device that is:
i) located within a building structure having the roof and
ii) configured to upload the tag data to a moisture assessment server.

Clause 12. The systems and methods of any of clauses 1-4, wherein the at least one processor is a processor of an Internet-of-Things device that is:
i) located within a building structure having the roof and
ii) configured to upload the first impedance value and the second impedance value to a moisture assessment server.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:
1. A system comprising:
a plurality of radio frequency (RF) tags;
wherein the plurality of RF tags is positioned at a plurality of locations throughout a roof;
wherein a plurality of location identifiers for the plurality of locations is stored in a database in communication with a computing device;
at least one tag reader configured to:
generate at least one reader RF signal at one or more frequencies to read the plurality of RF tags, and
detect at least one return RF signal from at least one RF tag of the plurality of RF tags;
wherein the at least one return RF signal of the at least one RF tag carries tag data comprising at least one impedance value and at least one tag identifier;
wherein the at least one tag identifier is associated with a corresponding location identifier of the plurality of location identifiers in the database;
at least one processor of the computing device;
wherein the at least one processor is programmed to:
receive the tag data;
determine, based on the at least one tag identifier of the tag data and from the database, a corresponding location of the at least one RF tag from the plurality of locations;
obtain at least one dry state linear regression function associated with the at least one tag identifier of the at least one RF tag;
determine a wet state or dry state of the roof at the corresponding location associated with the at least one RF tag based, at least in part, on:
i) the at least one impedance value of the at least one RF tag and
ii) the at least one dry state linear regression function of the at least one RF tag; and
output an indicator of the wet state or the dry state of the roof at the corresponding location.

2. The system of claim 1, wherein each location of the plurality of locations has a distance between 0.1 inches and 10 inches.

3. The system of claim 1, wherein the plurality of RF tags is arranged in a pre-determined pattern.

4. The system of claim 3, wherein the pre-determined pattern is a square grid.

5. The system of claim 1, wherein the at least one tag reader is at least one Internet-of-Things device that is:
  i) located within a building structure having the roof and
  ii) configured to upload, over a computer network, the tag data to a moisture assessment server; and
  wherein the computing device is the moisture assessment server.

6. The system as recited in claim 1, wherein the at least one processor is further configured to:
  determine, based at least in part on the at least one dry state linear regression function, at least one deviation of the at least one impedance value of the at least one RF tag; and
  determine the wet state or the dry state based on the deviation.

7. The system of claim 1, wherein the indicator of the wet state comprises an indication of at least one characteristic of a moisture content at the corresponding location of the roof.

8. A method comprising:
  causing, by at least one processor of at least one computing device, at least one tag reader to read, by at least one reader radio frequency (RF) signal at one or more frequencies, at least one RF tag located at a corresponding location of a roof to receive at least one return RF signal from the at least one RF tag;
    wherein the at least one return RF signal of the at least one RF tag encodes tag data comprising at least one impedance value and at least one tag identifier;
    wherein the at least one tag identifier of the at least one RF tag is associated with the corresponding location in a database in communication with the at least one computing device;
  receiving, by the at least one processor, the tag data;
  determining, by the at least one processor, based on the at least one tag identifier of the tag data and from the database, the corresponding location of the roof associated with the at least one RF tag;
  obtaining, by the at least one processor, at least one dry state linear regression function associated the at least one tag identifier of the at least one RF tag;
  determining, by the at least one processor, a wet state or a dry state of the roof at the corresponding location associated with the at least one RF tag based, at least in part, on the at least one impedance value of the at least one RF tag and the at least one dry state linear regression function of the at least one RF tag, and
  outputting, by the at least one processor, an indicator of the wet state or the dry state of the roof at the at least one corresponding location.

9. The method as recited in claim 8, further comprising:
  determining, by the at least one processor, based at least in part on the at least one dry state linear regression function, at least one deviation of the at least one impedance value of the at least one RF tag; and
  determining, by the at least one processor, the wet state or the dry state based on the at least one deviation.

10. The method of claim 8, wherein the corresponding location has a distance between 0.1 inches and 10 inches.

11. The method of claim 8, wherein the at least one processor is a processor of an Internet-of-Things device that is:
  i) located within a building structure having the roof and
  ii) configured to upload the tag data to a moisture assessment server.

12. A method comprising:
  causing, by at least one processor, at least one tag reader to read, by a plurality of reader radio frequency (RF) signals, at least one RF tag located at a corresponding location of a roof to receive a plurality of response RF signals;
    wherein the plurality of reader RF signals comprise:
      i) a first reader RF signal at a first frequency, and
      ii) a second reader RF signal at a second frequency;
    wherein the plurality of response RF signals comprise:
      i) a first response signal at the first frequency in response to the first reader RF signal, and
      ii) a second response signal at the second frequency in response to the second reader RF signal;
      wherein the second frequency is different from the first frequency;
    wherein a location identifier of the corresponding location is stored in a database;
  obtaining, by the at least one processor, a first impedance value of the at least one RF tag from the first response RF signal at the first frequency;
  obtaining, by the at least one processor, a second impedance value of the at least one RF tag from the second response RF signal at the second frequency;
  determining, by the at least one processor, a dry state linear regression function of the at least one RF tag based on a linear regression analysis of the first impedance value and the second impedance value; and
  storing, by the at least one processor, the dry state linear regression function associated with the at least one RF tag and the location identifier of the corresponding location of the roof in the database.

13. The method of claim 12, wherein the at least one tag reader is at least one Internet-of-Things device that is:
  i) located within a building structure having the roof and
  ii) configured to upload the first impedance value and the second impedance value to a moisture assessment server.

14. A method comprising:
  installing a plurality of radio frequency (RF) tags at a plurality of locations within a roof;
    wherein a plurality of location identifiers for the plurality of locations is stored in a database;
  providing at least one tag reader that is programmed to:
    generate at least one reader RF signal at one or more frequencies to read the plurality of RF tags;
    detect at least one return RF signal from at least one RF tag of the plurality of RF tags;
      wherein the at least one return RF signal of the at least one RF tag encodes tag data comprising at least one impedance value and at least one tag identifier;
      wherein the at least one tag identifier is associated with a corresponding location identifier of the plurality of location identifiers in the database;
  providing software instructions for execution by at least one processor, wherein the software instructions cause the at least one processor to:
  receive the tag data;
  determine, based on the at least one tag identifier of the tag data and from the database, a corresponding location of the at least one RF tag from the plurality of locations;
  obtain at least one dry state linear regression function associated with the at least one tag identifier of the at least one RF tag;
  determine a wet state or a dry state of the roof at the corresponding location associated with the at least one RF tag based, at least in part, on:
    i) the at least one impedance value of the at least one RF tag and ii) the at least one dry state linear regression function of the at least one RF tag; and output an indicator of the wet state or the dry state of the roof at the corresponding location.

15. The method of claim 14, wherein each location of the plurality of locations has a distance between 0.1 inches and 10 inches.

16. The method of claim 14, wherein the plurality of RF tags is arranged in a pre-determined pattern.

17. The method of claim 16, wherein the pre-determined pattern is a square grid.

18. The method of claim 14, wherein the at least one tag reader is at least one Internet-of-Things device that is:

i) located within a building structure having the roof and ii) configured to upload the tag data to a moisture assessment server; and wherein the moisture assessment server comprises the at least one processor.

19. The method as recited in claim 14, wherein the at least one processor is further configured to:

determine, based at least in part on the at least one dry state linear regression function, at least one deviation of the at least one impedance value of the at least one RF tag; and determine the wet state or the dry state based on the deviation.

20. The method of claim 14, wherein the indicator of the wet state comprises an indication of at least one characteristic of a moisture content at the corresponding location of the roof.

* * * * *